US012731426B1

(12) United States Patent
Pingali et al.

(10) Patent No.: US 12,731,426 B1
(45) Date of Patent: Sep. 8, 2026

(54) KNOWLEDGE GRAPH GENERATION FOR CONTEXTUAL DECISION MAKING

(71) Applicant: Jumio Corporation, Sunnyvale, CA (US)

(72) Inventors: Ashwin Pingali, Parker, CO (US); Arman Mohseni-Kabir, Carlsbad, CA (US); Marzieh Mehdizadeh, Sunnyvale, CA (US); Sudha Vijayakumar, Campbell, CA (US); Lulu Li, Millbrae, CA (US); Osvaldo Driollet, Carlsbad, CA (US)

(73) Assignee: Jumio Corporation, Sunnyvale, CA (US)

( * ) Notice: Subject to any disclaimer, the term of this patent is extended or adjusted under 35 U.S.C. 154(b) by 219 days.

(21) Appl. No.: 18/401,603

(22) Filed: Dec. 31, 2023

(51) Int. Cl.
*G06V 30/41* (2022.01)

(52) U.S. Cl.
CPC .................................... *G06V 30/41* (2022.01)

(58) Field of Classification Search
CPC ............ G06N 5/02; G06N 20/00; G06N 5/04; G06N 3/08; G06N 5/022; G06N 3/042; G06N 3/02; G06N 3/092; G06N 3/048; G06F 18/20; G06F 18/10; G06F 40/279; G06F 3/06; G06V 10/82; G06V 10/426; G06V 30/418
See application file for complete search history.

(56) References Cited

U.S. PATENT DOCUMENTS 7,769,704 B2 * 8/2010 Marfatia ................... G06F 8/51 706/45
10,991,053 B2 * 4/2021 Pingali ................... G06Q 40/12
11,238,115 B1 * 2/2022 Newman ............... G06F 16/337
11,816,596 B2 11/2023 Pingali
12,112,519 B1 * 10/2024 Polichroniadis ..... G06V 10/761
12,147,647 B2 * 11/2024 Marchetti .......... G06Q 10/0635
2010/0049538 A1 * 2/2010 Frazer ................ G06Q 30/0244 705/14.43
2012/0158633 A1 * 6/2012 Eder ...................... G16H 50/50 707/E17.014
2015/0317449 A1 * 11/2015 Eder ..................... A61B 5/1118 600/595
2016/0321661 A1 * 11/2016 Hammond ............. G06Q 20/20
2016/0364794 A1 * 12/2016 Chari ..................... G06Q 40/02
(Continued)

OTHER PUBLICATIONS

Youze Wang et al. , "Fake News Detection via Knowledge-driven Multimodal Graph Convolutional Networks," Jun. 8, 2020, ICMR '20, Oct. 26-29, 2020, Dublin, Ireland , pp. 540-546.*
(Continued)

*Primary Examiner* — Omar S Ismail
(74) *Attorney, Agent, or Firm* — Patent Law Works, LLP

(57) ABSTRACT

The disclosure includes a system and method for generating knowledge graphs for contextual decision making. A knowledge graph schema may be used to define node names and relationships. Data fragments associated with one or more received transactions are encoded as nodes in a transactional graph and then encoded as data fragment nodes in a knowledge graph. Connections between nodes of a knowledge graph may be generated based on the data fragments. Nodes are clustered to identify patterns. Based on contextual information captured through identified patterns, decisions may be reversed to identify fraud.

20 Claims, 22 Drawing Sheets

(56) References Cited

U.S. PATENT DOCUMENTS

| | | | | |
|---|---|---|---|---|
| 2019/0122111 | A1* | 4/2019 | Min | G06N 3/082 |
| 2019/0259033 | A1* | 8/2019 | Reddy | G06Q 20/4016 |
| 2019/0312869 | A1* | 10/2019 | Han | G06F 21/64 |
| 2019/0340614 | A1* | 11/2019 | Hanis | G06F 18/23 |
| 2019/0340615 | A1* | 11/2019 | Hanis | G06N 5/02 |
| 2019/0372940 | A1* | 12/2019 | Mcdougall | G06F 21/6254 |
| 2020/0401835 | A1* | 12/2020 | Zhao | G06V 10/255 |
| 2021/0248268 | A1* | 8/2021 | Ardhanari | G06N 20/00 |
| 2021/0304021 | A1* | 9/2021 | Puri | G06N 5/02 |
| 2022/0075948 | A1 | 3/2022 | Yuan | |
| 2022/0111960 | A1* | 4/2022 | Tran | A01G 7/00 |
| 2022/0292262 | A1* | 9/2022 | Japa | G06N 3/09 |
| 2023/0132720 | A1 | 5/2023 | Khmaissia | |
| 2023/0291756 | A1* | 9/2023 | Monnig | H04L 63/1425 |
| 2024/0013220 | A1* | 1/2024 | Martins | G06Q 30/018 |
| 2024/0221411 | A1 | 7/2024 | Wells | |
| 2024/0303662 | A1* | 9/2024 | Shah | G06Q 20/4016 |
| 2025/0200630 | A1* | 6/2025 | Wang | G06N 3/0455 |

OTHER PUBLICATIONS

Zhenguang Liu et al.,“Combining Graph Neural Networks With Expert Knowledge for Smart Contract Vulnerability Detection,” Jul. 7, 2021, IEEE Transactions on Knowledge and Data Engineering, vol. 35, No. 2, Feb. 2023, pp. 1296-1302.*

Weizhi Xu et al., “Evidence-aware Fake News Detection with Graph Neural Networks,” Apr. 25, 2022, WWW ’22: Proceedings of the ACM Web Conference 2022, pp. 2501-2505.*

Tristan Bilot et al.,“Graph Neural Networks for Intrusion Detection: A Survey,” May 12, 2023, IEEEAccess, vol. 11,2023, pp. 49114-49121.*

Xiao Li et al.,“Recognizing Object by Components With Human Prior Knowledge Enhances Adversarial Robustness of Deep Neural Networks,” Jan. 18, 2023, IEEE Transactions on Pattern Analysis and Machine Intelligence, vol. 45, No. 7, Jul. 2023, pp. 8861-8866.*

* cited by examiner

600

California USA DRIVER LICENSE
Fig. 7A
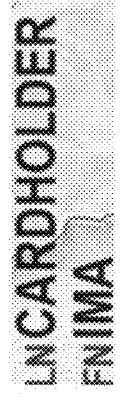
Fig. 7B
DL I1234568
Fig. 7C
DOB 08/31/1977
Fig. 7D
08311977
Fig. 7E
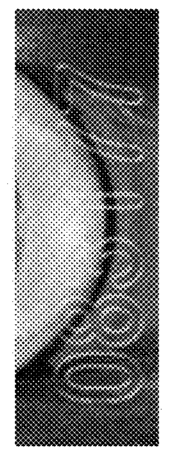
Fig. 7F

KNOWLEDGE GRAPH GENERATION FOR CONTEXTUAL DECISION MAKING

BACKGROUND

The present disclosure relates to knowledge management. More specifically, the present disclosure relates to developing and training knowledge graph models for fraud detection.

Documents are provided in many contexts. For example, identification documents (ID) such as a driver's license or other photo ID may be provided to prove a person's age or identity, as is the case with identification documents, as proof of ownership, as is the case with documents such as title documents, as proof of authenticity (e.g., a certificate of authenticity), as proof of address, etc. Those contexts may have significant, financial, legal, or safety implications.

Unstructured documents, such as customer contracts, often contain valuable information that can be used in the identity verification process. However, extracting this information and converting it into a usable format can be a challenging task. Techniques such as natural language processing and machine learning are often used to extract and analyze the information contained in unstructured documents.

Despite the advancements in technology, the process of identity verification still faces several challenges. One of the main challenges is the detection of anomalies in ID documents. Anomalies can occur due to various reasons such as incorrect labeling of the ID image, poor image quality, or fraudulent manipulation of the ID document. Additionally, fraudsters may improperly attribute a valid ID document to multiple people. Detecting these anomalies is a complex task that requires sophisticated algorithms and models. Over time, decisions on whether to trust a document may need re-examination.

SUMMARY

Graph-based reasoning is a technique used in artificial intelligence and machine learning to represent and analyze data. In this context, a graph is a mathematical structure that models the relationships between various entities. Graph-based reasoning can be used to represent and analyze the relationships between different fragments of information in an ID document. Transactional graphs and knowledge graphs are two types of graphs commonly used in graph-based reasoning. A transactional graph represents the relationships between different transactions, decisions, and outcomes associated with those transactions. On the other hand, a knowledge graph represents the relationships between different pieces of knowledge and information. These graphs can be used to analyze and understand the context of a transaction, and to make predictive decisions based on the information contained in the graphs.

With the advent of digital technology, identity verification has evolved from manual checks to automated systems. These systems often employ machine learning models and algorithms to analyze and verify the information presented in an ID document. The information is often broken down into smaller fragments for detailed analysis. These fragments can include text, images, and other identifiable features present in the ID document. Other data fragments may be included in a graph database, such as photo fragments, context fragments, channel fragments, and identity fragments. For example, photo fragments may include biometric features such as face layout, face location, facial recognition points, background features, and the relative positioning of the face with respect to the background. Context fragments may include time, location, transaction history and other behavioral patterns associated with a transaction. Channel fragments include contextualized information based on the use of devices and internet channels with specific identifiers such as IP address, device fingerprints, device identifiers, and the like. Identity fragments include various symbolic fragments associated with a specific identity, such as name, date of birth used to identify a person, a document number, the document's issue and expiration dates for verifying the authenticity of a document, a government issued identity such as a social security number, CURP number (a unique code which identifies all Mexican citizens and resdients), CPF (a tax identifier issued when a person registers with the Brazilian Revenue) and other identifiers used for uniquely identifying the person within a country.

A system and method for development of knowledge graphs for fraud detection is described herein. It also has application as a testing and validation tool for decisions made by a deep learning model. In one implementation, a visual grammar for cellular fragments is defined to aid knowledge graph design and detecting variance and invariance patterns as sub-graphs used to train a reasoning module as well as compute anomalies. Some examples of anomalies include fraud/manipulated image anomalies and calculating risk of fraud by association of a data fragment with patterns, meta-patterns, and other graph-based determinations of fraud.

In general, the system features a transactional graph module configured to populate information obtained from transactions, decisions, and outcomes associated with the transactions. The system also includes a knowledge graph module configured to generate multiple knowledge graphs based on the information from the transactional graph module. Furthermore, the system comprises a reasoning module configured to communicate with the transactional graph module and the knowledge graph module. The reasoning module is further configured to evaluate information fragments associated with a new transaction and compare them with the knowledge graphs.

Embodiments of the system may include one or more of the following features. The transactional graph module may be further configured to store additional contexts that might be relevant to understand the information fragments, such as a strong identity association of identity fragments to one individual. Similarly, the document number within an ID class or category is strongly associated with only one document. The knowledge graph module may be further configured to capture knowledge from various sources, including unstructured documents and business rules, and convert them into rules stored in the knowledge graph. The reasoning module may be further configured to contain machine learning models or probabilistic graph models to evaluate the information fragments associated with a new transaction and determine a risk of fraud. The system may further comprise a time travel module configured to understand how decisions diverge with graph evolution and use this information to reverse a previously made decision on a fraud risk score and train neural networks to make predictive decisions based on a probabilistic understanding of the graph evolution.

In general, the method also features populating a transactional graph with information obtained from transactions, decisions, and outcomes associated with the transactions. The method also includes generating multiple knowledge graphs based on the information from the transactional graph. Furthermore, the method involves communicating with the transactional graph and the knowledge graph to evaluate information fragments associated with a new transaction and comparing them with the various information fragments, generated patterns and meta-patterns stored in the knowledge graphs to determine a fraud risk for the new transaction.

BRIEF DESCRIPTION OF THE DRAWINGS

The disclosure is illustrated by way of example, and not by way of limitation in the figures of the accompanying drawings in which like reference numerals are used to refer to similar elements.

FIGS. 7A, 7B, 7C, 7D, 7E, and 7F illustrate examples of patches from a California Driver's License in accordance with some implementations.

DETAILED DESCRIPTION

A user wishing to establish their identity with an entity, e.g., a government agency or a commercial enterprise, may be asked to submit an image of an identification document (ID) through the entity's application on their mobile phone or through the entity's portal on a web browser. The entity may, depending on the implementation, request verification of the document by the document evaluation systems and methods described herein. The ID may, for example, be a driver's license, passport, national identification card, or other type of photo ID.

Fraudsters may leverage technology to automate a series of repeated, fraudulent attempts to mislead an entity until a successful vector of attack is discovered, and their attacks may become increasingly more sophisticated (e.g., using photo editing software, such as Photoshop to modify images of valid documents to create fake/invalid documents, such as fake IDs). Data integrity issues, or fraudulent patterns, may be detected over time using one or more knowledge graphs. However, as discussed below in more detail, a knowledge graph may be used to perform an evaluation and/or re-evaluation of a decision and/or calculation of a risk score for fraud. Ground truth learning and human curation of some types of information may be supported. In one implementation, the use of knowledge graphs and a knowledge graph scheme permits the creation of patterns of one or more sub-graphs of data fragments associated with one or more transactions, converting the patterns into vectors, comparing the vectors for similarity, and then identifying the sub-graphs for discrepancies and evaluating the risk associated with the discrepancy to classify the irregularity (e.g., as a fraud or as trusted, as a few examples). In an embodiment, the use of sub-graphs and vectors permits relationships and/or associations between invariant portions of images to be analyzed and used to detect anomalies that might not be visible to the naked eye, as an example. Other examples of data associations that may be made through the use of the knowledge graphs and/or data fragments in conjunction with rules, patterns, and meta-patterns are discussed herein.

High Level System for Knowledge Graph Development for Fraud Detection

Figure 1:
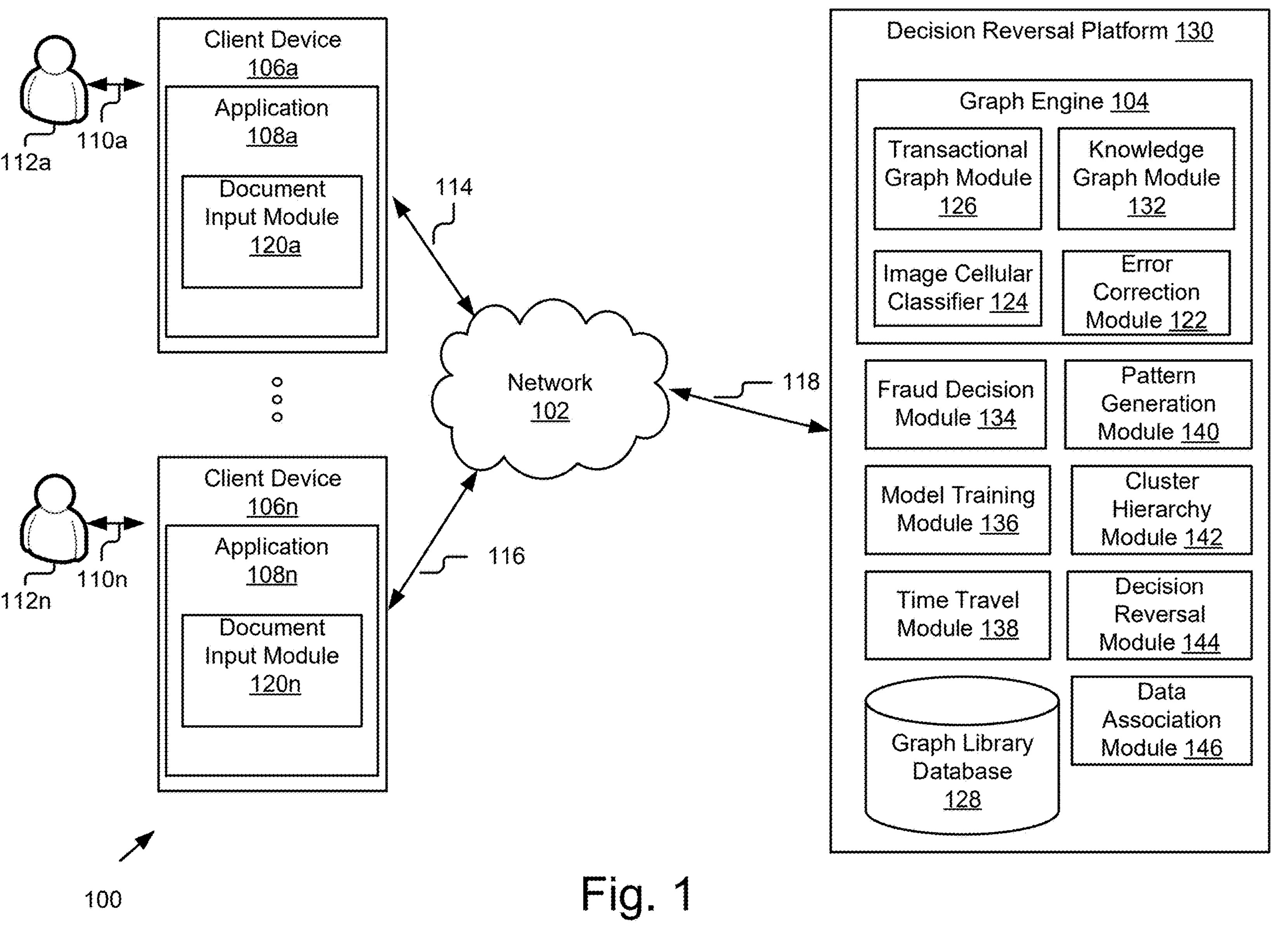
FIG. 1 is a block diagram of one example implementation of a platform for decision reversal and a system for knowledge-based document evaluation to determine fraud risk in accordance with some implementations.

FIG. 1 is a block diagram of an example system 100 for knowledge graph development in accordance with some implementations. A Decision Reversal Platform 130 may be implemented in different ways, such as being implemented on a stand-alone computing device, such as a network server or a cloud-based server, as well as other implementations. As depicted, in one example the system 100 includes client devices 106*a* . . . 106*n*, and a decision reversal platform 130 coupled for electronic communication via a network 102.

Each client device 106 is a computing device that includes a processor, a memory, and network communication capabilities (e.g., a communication unit). The client device 106 is coupled for electronic communication to the network 102 as illustrated by signal line 114. In some implementations, the client device 106 may send and receive data to and from other entities of the system 100 (e.g., a server 122). Examples of client devices 106 may include, but are not limited to, mobile phones (e.g., feature phones, smart phones, etc.), tablets, laptops, desktops, netbooks, portable media players, personal digital assistants, etc. A user 112 may interact with client device 106, such as taking selfies of themselves or taking photo image of photo IDs, which are captured by document input module 120 through application 108 and sent to the decision reversal platform 130.

Although multiple client devices 106 are shown in FIG. 1, it should be understood that there may be any number of client devices 106. It should be understood that the system 100 depicted in FIG. 1 is provided by way of example and the system 100 and/or further systems contemplated by this present disclosure may include additional and/or fewer components, may combine components and/or divide one or more of the components into additional components, etc. For example, the system 100 may include any number of client devices 106, networks 102, and/or servers (not pictured).

The network 102 may be a conventional type, wired and/or wireless, and may have numerous different configurations including a star configuration, token ring configuration, or other configurations. For example, the network 102 may include one or more local area networks (LAN), wide area networks (WAN) (e.g., the Internet), personal area networks (PAN), public networks, private networks, virtual networks, virtual private networks, peer-to-peer networks, near field networks (e.g., Bluetooth®, NFC, etc.), cellular (e.g., 4G or 5G), and/or other interconnected data paths across which multiple devices may communicate.

A server (not pictured) is a computing device that includes a hardware and/or virtual server that includes a processor, a memory, and network communication capabilities (e.g., a communication unit). The server may include data processing, storing, and communication capabilities, as discussed elsewhere herein. For example, the server may include one or more hardware servers, server arrays, storage devices, centralized and/or distributed/cloud-based systems, etc. In some implementations, the server may include one or more virtual servers, which operate in a host server environment and access the physical hardware of the host server including, for example, a processor, a memory, applications, a database, storage, network interfaces, etc., via an abstraction layer (e.g., a virtual machine manager). In some implementations, the server may be a Hypertext Transfer Protocol (HTTP) server, a Representational State Transfer (REST) service, a GraphQL service or other server type, having structure and/or functionality for processing and satisfying content requests and/or receiving content from the other entities coupled to the network 102. The server may implement one or more stateful services and store session state for one or more client devices 106 interacting with it. For example, the server may keep track of one or more requests from client devices 106, which client device has opened which file, current read and write pointers for files, which files are locked by which client device 106, etc. The server may be communicatively coupled to the network 102. In some implementations, the server may send and receive data to and from other entities of the system 100 (e.g., one or more client devices 106).

In some implementations, the server may be remote to the client device 106 and/or the decision reversal platform 130, such that the server communicates with the platform 130 to perform functions, thereby reducing complexity of the server. A server may include a web service dedicated to providing access to various services and information resources hosted by the server via web, mobile, enterprise, and/or cloud applications. The web service may include one or more of a software as a service, infrastructure as a service, platform as a service, function as a service, etc. For example, the web service may include on-demand cloud computing service and associated application programming interface (API) for providing distributed computing processing capacity and software tools. In another example, the web service may include allowing users to rent a virtual cluster of machines for deploying applications. It should be noted that the list of services provided as examples for the web service above are not exhaustive and that others are contemplated in the techniques described herein.

The decision reversal platform 130 may be operable on a computing device, such as a server, that includes a hardware and/or virtual server that includes a processor, a memory, and network communication capabilities (e.g., a communication unit). The decision reversal platform 130 may be communicatively coupled to the network 102, as indicated by signal line 118. In some implementations, the decision reversal platform 130 may send and receive data to and from other entities of the system 100 (e.g., one or more client devices 106, server and/or external data sources (not pictured)).

The decision reversal platform 130 includes a graph engine 104 which further includes a transactional graph module 126, a knowledge graph module 132, an error correction module 122, and an image cellular classifier 124. The decision reversal platform 130 may further include a fraud decision module 134, a model training module 136, a time travel module 138, a pattern generation module 140, a cluster hierarchy module 142, a decision reversal module 144, a data association module 146, and a database 128.

The graph engine 104 is designed to generate transactional graphs and knowledge graphs for enabling a fraud decision module 134 to decide whether an ID is authentic or fake based on association with trusted or known fraudulent patterns and/or meta-patterns. The graph engine 104 includes transactional graph module 126, knowledge graph module 132, an error correction module 122, and image cellular classifier 124.

The transactional graph module 126 may include software and/or logic to provide the functionality for populating information obtained from the transactions, decisions, and outcomes associated with the transactions. It also incorporates other information that is deemed relevant to contextualize the transaction from a merchant perspective, in an embodiment. This includes data sources, IP address classes, device types, and other contextual information such as the type of merchant and the industry the merchant is associated with. The transactional graph module 126 serves as a comprehensive repository of transaction-related data, providing a multi-dimensional view of a transaction, in an embodiment. It captures various information fragments associated with the transaction, thereby enabling a detailed analysis of each transaction. The transactional graph module 126 may be implemented using programmable or specialized hardware, such as a field-programmable gate array (FPGA) or an application-specific integrated circuit (ASIC). In some implementations, the transactional graph module 126 may be implemented using a combination of hardware and software. In some implementations, the transactional graph module 126 may be stored and executed on various combinations of the client devices 106 and the decision reversal platform 130, or by any one of the client devices 106, or the decision reversal platform 130.

Transactions and their associated fragments are encoded as nodes and relationships into the Graph database by taking care not to duplicate the fragment nodes while keeping transaction nodes unique. After all of the transactions are encoded as nodes and relationships, the uniqueness property of the identity fragment prevents duplication of nodes. Then, connections between the identity fragments may be built alone without the transactions. For example, if there are transactions between any two identity fragments, a direct connection can be made between them through the data association module 146, in an embodiment. Suppose a transaction (T1) connects a document (D1) to a person (P1). A second transaction (T2) may connect the same document (D1) to a different person (P2). This creates a network that is depicted in FIG. 3B.

A simplified projection of the graph that connects these identity fragments together may then be created. These transaction-free identity fragment associations enables the platform 130 to identify patterns that can be coded as typology patterns, as illustrated in FIGS. 3C, 4A, 4B, and 4C. Patterns may be condensed and abstracted to reveal meta-patterns that can be used to identify multiple sub-graphs and can be coded as such in a library. Condensing the patterns (or the entire sub-graph) as a single node enables the platform 130 to represent the node and its association with a group of scans grouped by the decisions that have been associated with these groups of scans. A group of scans associated with a typology pattern may fall into three decision groups: (1) all scans associated with the typology pattern are considered "genuine" or "OK"; (2) all scans associated with the typology pattern are considered "fraudulent"; (3) some scans associated with the typology pattern are considered "OK" and some considered "fraudulent."

From the transactional graph, a set of sub-graph patterns and meta-patterns may emerge to determine if the graph context gives a different set of fraud indicators from the existing local context based on one or more machine learning models.

As depicted in FIG. 1, the transactional graph module 126 is shown to indicate that the operations performed by the transactional graph module 126 as described herein may be performed at the decision reversal platform 130. In other implementations, the transactional graph module 126 may be a thin-client application with some functionality executed on a server and additional functionality executed on the decision reversal platform 130. While the transactional graph module 126 is described below as a stand-alone component, in some implementations, the transactional graph module 126 may be part of other applications in operation on the client device 106 and the decision reversal platform 130.

The knowledge graph module 132, on the other hand, leverages the information stored in a database 128 by the transactional graph module 126 to generate multiple knowledge graphs. These knowledge graphs take into account the quality of the information, the context of the transaction, and the outcomes of the transaction, in an embodiment. The knowledge graph module 132 may include software and/or logic to provide the functionality for generating knowledge graphs that associate transaction outcomes across different transaction contexts in a probabilistic fashion. This enables other methods, programmatic techniques, and algorithms to use a score that represents the quantification of risks and uncertainties associated with each transaction.

The knowledge graph module 132 operates by generalizing information from the transaction and creating a comprehensive picture of what fragments have been identified, as determined by the image cellular classifier 124. Additionally, in some embodiments, the knowledge graph module 132 also determines how the identified fragments influence the decisions and actual outcomes associated with each transaction over time. This rich context of information fragments is then used to infer and ingest knowledge in a probabilistic fashion from transaction data, decisions taken, and the actual outcomes. The knowledge graph module 132 is integral in transforming raw transaction data into actionable knowledge for identity verification purposes.

The image cellular classifier 124 may include software and/or logic to provide the functionality for classifying cellular fragments in an image. For example, cellular fragments for a specific ID, such as a California Driver's License, may be generated by the image cellular classifier 124 such that the same number of fragments of the same size are used to describe all ID classes. In this way, a visual grammar may be generated from the cellular fragments, such as text fragments, describable fragments, and non-describable fragments. A grid pattern of cellular fragments across the image of a California Driver's License may be implemented, in an embodiment. Negative space cell fragments are differentiated from the text fragments, describable fragments, and non-describable fragments.

Figure 9B:
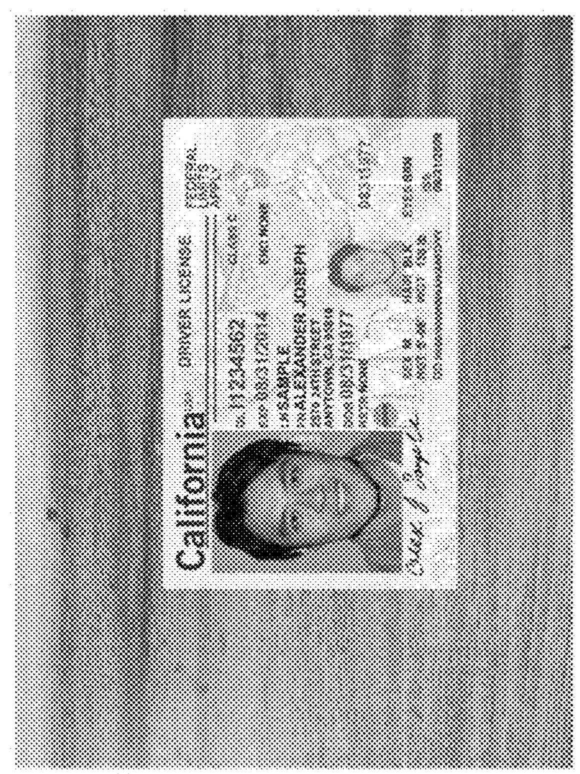
FIG. 9A, FIG. 9B and FIG. 9C illustrate two different IDs photographed on the same background submitted in two transactions in accordance with an implementation.
Figure 9C:
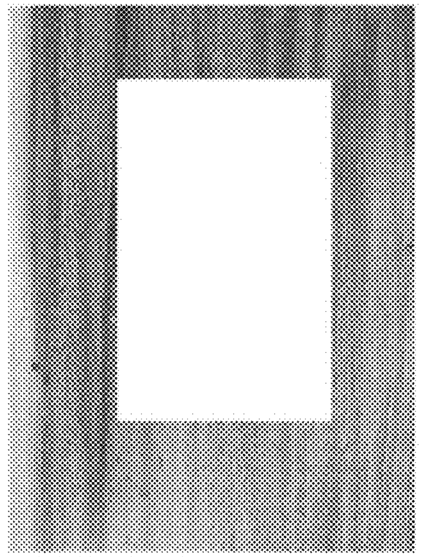
Figure 9A:
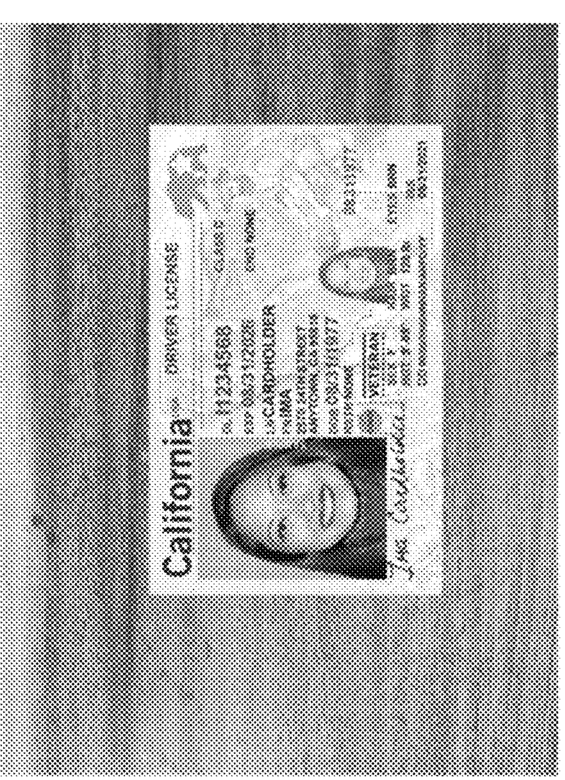

The image cellular classifier 124 may also identify negative space fragments by masking a portion of a describable image. Using a masking function, the describable portions of an image (e.g., the portions that make up the ID being verified, text or images being analyzed) may be modified to generate the negative space fragments. For example, a selfie masking, entire ID masking, and a face masking on an ID may include example negative space fragments. A grid of cells may also be applied on the negative space fragments. A meta pattern or sub-graph of negative and positive space fragments may be obtained by masking a portion of the desirable image. While both the images themselves may be changed the spatial relationships are unaltered signifying the signature of an automation pipeline that is using deep fake image replacements. These meta-patterns show how different faces or different backgrounds could be layered without changing the relative positions. In a selfie, the position of the face in relation to the background is not the same across two different images even within the same transaction. However, if the position of the face in context to the background even when both the face and the background are changed is very highly unlikely and is indicative of a deep fake automation pipeline. In this way, attempts at submitting fraudulent IDs may be identified based on identifying that the negative spaces of two images are identical, such as the images shown in FIGS. 9A, 9B, and 9C. In that example, the negative space, shown in FIG. 9C, includes the wood grain of a desk. The negative spaces of the two images depicted in FIGS. 9A and 9B are identified as identical to the negative space illustrated in FIG. 9C. Thus, it may be properly deduced that a fraudster may have submitted the images in FIGS. 9A and 9B because the probability of the negative spaces being identical is determined to be quite low or inputted as a rule that negative spaces should not be identical.

An error correction module 122 may include software and/or logic to provide the functionality for determining a potential risk score for an error in making a decision based on the knowledge graphs for each transaction. For example, on a first scan of an ID, captured in a transactional graph by the transactional graph module 126, the fraud decision module 134 may have not detected any irregularities or anomalies. Thus, the scan may have been deemed "OK" and an error score for the transaction may be low. However, as more transactions occur over time, such as transactions associated with the same IP address as the first scan in a defined time period for ID documents connected to individuals in different portions of the world, the potential risk for a false acceptance of the first scan increases significantly. This is an example of a rule that may be defined by administrators of a decision reversal platform 130, in an embodiment. The error correction module 122 maintains the error score for each transaction based on various rules, patterns, and/or meta-patterns being recognized, in an embodiment.

As further illustrated in FIG. 1, the decision reversal platform 130 may include software and/or logic to provide the functionality for generating knowledge graphs to enable a service to produce a response to received user input including a new image for the decision reversal platform 130 to produce a decision score based on the existing knowledge graphs, according to an embodiment. For example, the decision reversal platform 130 may include a fraud decision module 134, a model training module 136, a time travel module 138, a pattern generation module 140, a cluster hierarchy module 142, a decision reversal module 144, a data association module 146, and a database 128.

The fraud decision module 134 may include software and/or logic to provide the functionality for facilitating communication with the graph engine 104 and evaluating identified information fragments associated with a new transaction. The fraud decision module 134 employs machine learning models and/or probabilistic graph models to evaluate these information fragments. These models are designed to analyze the information fragments in a comprehensive and nuanced manner, considering various factors such as the quality of the information, the context of the transaction, and the outcomes of previous similar transactions. For example, the fraud decision module 134 may include pattern recognition software to identify whether the information fragments are identical (or invariant) where some variance is expected. A fake ID may include the same negative space fragments, for example, from other transactions. The fraud decision module 134 would then assign a high probability score that the submitted ID in the new transaction is fraudulent. In other embodiments, the fraud decision module 134 may use one or more data fragments associated with the transaction to arrive at a decision on whether to trust the transaction as valid or reject the transaction as fraudulent.

In an embodiment, the information fragments may be evaluated for discrepancies by comparing these fragments with other fragments generated and/or stored in the knowledge graphs generated by the knowledge graph module 132. This comparison process involves evaluating the typologies (photo fragment, context fragment, identity fragment, channel fragment) and inconsistencies of the information fragments associations within existing knowledge graphs. The fraud decision module 134 is designed to identify and highlight any discrepancies or anomalies in the information fragment associations, thereby providing a detailed and nuanced understanding of each transaction.

Furthermore, the fraud decision module 134 quantifies the risks associated with each transaction based on the knowledge obtained from the knowledge graphs. This risk quantification process is probabilistic in nature, meaning that the inherent uncertainties and variabilities associated with each transaction are considered and quantified as a numerical risk score from zero to one [0,1]. By quantifying the risks in this probabilistic manner, the fraud decision module 134 can provide a more nuanced and detailed understanding of each transaction, thereby enabling more informed and accurate identity and ID document verification decisions. For example, as will be further described herein, a rule inputted as a "belief of the world" may include that an identity document, such as a California Driver's License, may only be associated with one person. Thus, in a situation where the same identity document is associated with two different people, in two separate transactions, one of the transactions will be determined to be "OK" while the other transaction will be determined to be "FRAUD" based on a number of other rules, patterns, and/or meta-patterns.

A model training module 136 may include software and/or logic to provide the functionality for generating training datasets and training one or more machine learning models, probabilistic graph models, and/or classifiers using the training datasets in the decision reversal platform 130. In some implementations, the model training module 136 curates one or more training datasets based on the data from the knowledge base of trusted transactions and fraudulent transactions generated by administrators of the decision reversal platform 130. For example, the model training module 136 receives the image data representing example ID verification requests, executes various processes to ingest the data using the graph engine 104, and derives sample ID verification history data for generating the training datasets. Example training datasets curated by the model training module 136 may include, but not limited to, a dataset of data fragments associated with fraudulent transactions and trusted transactions. Data fragments associated with the fraudulent transactions are used to train one or more machine learning models to identify future transactions as fraudulent. Similarly, data fragments that are associated with trusted transactions are used to train one or more machine learning models to identify future transactions as trusted. Data fragments and their properties may be derived using various patch processing functions. This data is then stored in the knowledge graph in the database 128. In some implementations, the model training module 136 may receive a ground truth training dataset, such as a gold standard image of a particular type of ID, such as a California Driver's License. The model training module 136 stores the curated training datasets in a database 128 or other data storage connected to the decision reversal platform 130. The model training module 136 uses the training datasets to train the machine learning models for performing the various functionality as described herein. The model training module 136 stores the trained machine learning models in the database 128.

The model training module 136 creates one or more machine learning models for the graph engine 104 (described in detail below) to identify different portions of an ID, including text fragments, describable image fragments, and non-describable fragments as well as negative space fragments. In some embodiments, dataset specific machine learning (ML) models may be generated by the model training module 136. These dataset specific ML models may be stored as ML models in database 128. For example, a machine learning model may be a trained model or classifier that is able to identify numerical characters (e.g, numbers {0-9}) and distinguish them from other ASCII characters (e.g., letters {a-z}). In another example, a machine learning model and/or probabilistic graph model may be a trained model or classifier that is able to classify information fragments into a visual grammar of text fragments, describable image fragments, non-describable fragments, and negative space fragments.

The model training module 136 facilitates providing input necessary to create a particular machine learning model. In some implementations, the model training module 136 receives and/or generates data, models, training data, and scoring parameters necessary to create a machine learning model and/or probabilistic graph model. For example, the model training module 136 may provide curated images of differing quality, provide ID gold standard templates, provide model negators, perform training, testing, approve, and publish model versions for consumption, perform scoring model parameter tuning, or create scoring accuracy thresholds for generating a model. The model training module 136 is adapted to receive input from users, such as data scientists, analysts, administrators, and/or operational staff to define and enhance the machine learning models and/or probabilistic graph models. For example, the operational staff may increase or decrease weights for different rules, decisions, and/or outcomes in the retraining of the machine learning models. The model training module 136 may provide a secure portal through which these users may define, train, test, publish, refine, and improve the machine learning models or introduce new models. For example, the portal may be used to define, train, test and publish models for generating scores for validating submitted ID images. The portal allows the users to provide training data—images, model negators, etc. The portal enables the users to define and modify scoring thresholds. The portal allows users to enhance the models during training using machine learning hints, patterns, and/or external sources of data. The portal further enables the users to control or reduce the overlap of inputs between classes (i.e., text fragments, describable fragments, non-describable fragments, and negative space fragments) during the training of a machine learning model.

In some implementations, the model training module 136 emphasizes certain sets of features, traits or attributes in a machine learning model during hyperparameter tuning for improving recognition, accuracy, computational speed, etc. For example, the machine learning models may be trained based on the following features or attributes, including but not limited to: text, facial recognition, pattern recognition in negative space, global template recognition, masking functions, etc. The model training module 136 provides the machine models to the database 128 for storage.

In some implementations, the model training module 136 may be configured to incrementally adapt and train one or more machine learning models every threshold period of time. For example, the model training module 136 may incrementally train the machine learning models 226 every hour, every day, every week, every month, etc. based on the aggregated dataset and feedback data generated based on prior predictions made by the machine learning models. In some implementations, a machine learning model may be implemented as a neural network model and includes a layer and/or layers of memory units where memory units each have corresponding weights. A variety of neural network models may be utilized including feed forward neural networks, convolutional neural networks (CNN), recurrent neural networks, radial basis functions, other neural network models, as well as combinations of several neural networks. Additionally, the machine learning model may represent a variety of other machine learning techniques in addition to neural networks, for example, support vector machines, decision trees, Bayesian networks, random decision forests, k-nearest neighbors, linear regression, least squares, hidden Markov models, other machine learning techniques, and/or combinations of machine learning techniques.

In some implementations, the model training module 136 may train the machine learning model using any one of at least one of supervised learning (e.g., support vector machines, neural networks, logistic regression, linear regression, stacking, gradient boosting, etc.), unsupervised learning (e.g., clustering, neural networks, singular value decomposition, principal component analysis, etc.), or semi-supervised learning (e.g., generative models, transductive support vector machines, etc.). Additionally, or alternatively, the model training module 136 may train the machine learning model using tensor networks. For example, the model training module 136 may mine the knowledge base of the one or more knowledge graphs to build links across the objects, such as graph analytics, positioning of recognized text fragments in association with describable fragments, and so forth, based on features or attributes that they share with each other in order to train the machine learning models.

In some implementations, the model training module 136 uses keyword-based database lookups, or search by keywords and dataset specific terms to implement training of one or more machine learning models. For example, the model training module 136 may use keyword extraction for unsupervised training of classification of user input. In some implementations, the model training module 136 may train one or more machine learning models to perform a single machine learning task or a variety of machine learning tasks. In other implementations, the machine learning model may be trained to perform multiple tasks. In yet other implementations, the model training module 136 may train a machine learning model to receive the requested data and generate the response data.

The model training module 136 determines a plurality of training instances or samples from the training dataset. The model training module 136 may apply a training instance as input to a machine learning model. The model training module 136 may generate a predicted machine learning model output by applying training input to the machine learning model. Additionally, or alternatively, the model training module 136 may compare the predicted machine learning model output with a known labelled output from the training instance and, using the comparison, update one or more weights in the machine learning model. In some implementations, the model training module 136 may update the one or more weights by backpropagating the difference over the entire machine learning model.

In some implementations, the model training module 136 may test a trained machine learning model and update it accordingly. The model training module 136 may partition the training dataset into a testing dataset and a training dataset. The model training module 136 may apply a testing instance from the training dataset as input to the trained machine learning model. A predicted output generated by applying a testing instance to the trained machine learning model may be compared with a known output for the testing instance to update an accuracy value (e.g., an accuracy percentage) for the machine learning model. In some implementations, the model training module 136 may version and service the model through an internal HTTP endpoint to be used by other component(s) of the document evaluator 226. For example, once a model is trained and tested and determined to have acceptable accuracy (e.g., accuracy score satisfying a threshold), the model training module 136 pushes the model to the graph engine 104 for consumption. In some implementations, model development is an iterative process with retraining, testing and publishing steps performed iteratively, and adapted automatically to improve scores and accuracy. New versions will be published based on improvements and retraining using historical data and efficiency calculations as more data (e.g., feedback) is collected over a period of time. Feedback data may be used to develop new versions of models, in an embodiment. For example, the model or classifier class labels (e.g., information fragments) may require administrative and business oversight and will be promoted for usage by capability based on administrative and business review. Continuous retraining using training data is performed based on curation as part of knowledge graph data analysis and development, in an embodiment.

The time travel module 138 may include software and/or logic to provide the functionality for re-evaluating information stored the knowledge graph and for use in training the fraud decision module 134 and/or generating training datasets by the model training module 136. The time travel module 138 is designed to track and analyze the changes in the knowledge graph over time, such as new information received about previously verified transaction and considering the new information in generating a decision reversal, thereby providing a dynamic and evolving understanding of the transactions stored as nodes and identity fragments stored as associations in the knowledge graph.

The time travel module 138 operates by continuously monitoring the knowledge graph and recording the changes in the knowledge graph as different versions over time. This includes changes in the information fragments associated with each transaction, changes in the decisions and outcomes associated with each transaction, and changes in the overall structure and relationships within the knowledge graph. By tracking these changes, the time travel module 138 can capture the evolution of the knowledge graph in a detailed and nuanced manner. For example, new information may reveal that a previous decision to approve a transaction as verified, such as an IP address channel data fragment, may be associated with a cluster of known fraudulent transactions. Thus, the time travel module 138 may operate to reverse the decision to mark the old transaction as fraudulent in the knowledge graph.

The training process involves using the contextual knowledge extracted from the transactional graph and other sources. This contextual knowledge includes a wide array of information, such as the type of merchant, the industry the merchant is associated with, the data sources, the IP address classes, the device types, and other relevant data. By incorporating such diverse and detailed information, the time travel module can provide a comprehensive and nuanced training for the fraud decision module 134.

Furthermore, the time travel module 138 takes into account the probabilistic nature of the knowledge graph. This means that the training provided by the time travel module 138 is not based on fixed and static information, but rather on dynamic and evolving information that takes into account the inherent uncertainties and variabilities associated with each transaction. This probabilistic approach to training enhances the ability of the fraud decision module 134 to accurately evaluate the information fragments and quantify the risks associated with each transaction.

In summary, the time travel module 138 provides an understanding of the evolution of the knowledge graph and provides useful training datasets for training the fraud decision module 134. It uses the contextual knowledge extracted from the transactional graph and other sources to effectively train the fraud decision module 134, thereby enhancing the accuracy and effectiveness of the fraud decision module 134 in evaluating the information fragments and quantifying the risks associated with each transaction.

A pattern generation module 140 may include software and/or logic to provide the functionality for identifying and generating patterns and meta-patterns from transactional graph data and the training datasets in the decision reversal platform 130. In some implementations, the pattern generation module 140 incorporates rules formulated by administrators of the decision reversal platform 130. For example, "belief of the world" patterns may incorporate into rules various beliefs held by the administrators, such as an identity is unique and is associated with one person, and that a strong association of an identity feature, such as biometrics (e.g., facial features), and all likeness of the same face belong to the same person. These "beliefs of the world" may be converted into the following graph patterns created by administrators of the platform 130, such as one document—multiple persons/names, one identity—multiple persons/names, one face—multiple persons/names, one person/name—multiple identities (e.g., social security numbers, CURP numbers, CPF, etc.), one person/name—multiple documents, one face—multiple names, and so on. Additionally, new meta-patterns may be generated based on credible evidence linking a particular sub-graph pattern of identity fragments with a collection of known or eventually known fraudulent transactions. For example, a meta-pattern of fraudster domain knowledge pattern could be generated as a result of recognizing the same IP address being used in association with validated multiple distinct identity fraudulent transactions when multiple unvalidated "OK" transactions occur within a short interval of time. Domain knowledge patterns may also include higher order cluster connectivity transactions as identified by the cluster hierarchy module 142 in which specially connected components of clusters reveal evidence of the meta-pattern. Additionally, meta-patterns may be implicitly derived from examining vast collections of transactions and encoding meta-pattern behavior if it is seen overwhelmingly in fraud transactions and seldom seen or never seen in trusted transactions.

In an embodiment, patterns may be generated by known users whose transactional behavior has been validated over a longer period of time. A behavior pattern that establishes trust may include a series of transactions and the different meta-patterns can be coded as a meta-pattern distribution likelihood. A rule may be implemented such that any meta-patterns that violate or are not part of a known meta-pattern distribution or falls outside the likelihood is deemed to require attention and evaluation. Establishment of trust may also be evaluated by examining a statistically significant number of sample transactions that fall across the entire meta-pattern distribution likelihood and proven to be genuine with a very high level of confidence. Similarly, meta-patterns of violation, when validated with a substantial portion of samples, will be coded as an anti-behavioral pattern that establishes a violation of trust. A meta-pattern of an anti-behavioral pattern may be established by aggregating transactional fragments by label types and then assessing the linkage of the meta-pattern with known/validated fraudulent transaction patterns and trusted transaction patterns.

A cluster hierarchy module 142 may include software and/or logic to provide the functionality for clustering data captured in knowledge graphs in the decision reversal platform 130. In some implementations, the cluster hierarchy module 142 may be used to identify various identity, channel, photo, and contextual data fragments from the transaction data. These set of fragments may fit a pattern or a meta-pattern within a graph library of validated and established trust patterns. Additionally, noise and/or sensor error patterns may be known such that noise may be identified when extracting data and/or creating various fragments and cleaning up the graph. Each type of data fragment may use a cluster hierarchy technique, as implemented by the cluster hierarchy module 142. For example, a data fragment may include a photo fragment that includes biometric features such as a face layout, face location, facial recognition points, background features and the relative positioning of the face with respect to the background. As another example, a data fragment may include context fragments of a transaction, such as time, location, transaction history and other behavioral patterns. A further example of a data fragment may include channel fragments that identify devices and internet channels that can be contextualized with specific identifiers such as IP address, device fingerprints, and device identifiers. Lastly, a data fragment may include other identity fragments, including various symbolic fragments such as name, date of birth used to identify a person, a document number, its issue and expiry dates for verifying the authenticity of a document, and a government issued identity such as social security number (SSN), CURP, and CPF that are used for uniquely identifying the person within a country.

The cluster hierarchy module 142 may be used to cluster transactions based on uniquely identifiable fragments. For example, face fragments, while having a strong identity association with a person, may also have a negative correlation across transactions for face layouts and selfie-to-background positions. Thus, if a fraudster used the same exact face layout and/or selfie-to-background position in various photos, the clustering of the face layout and/or selfie-to-background position may be used to identify potential fraudulent transactions. As another example, contextual fragments such as IP address and device identifiers, while not strongly associated with an identity, remain uniquely identifiable within an accepted error range. By clustering transactions based on IP address, a small finite number of individual identities may be accepted to be associated with the IP address within a given period of time. However, a number outside of the accepted error range may be used to identify potentially fraudulent transactions.

A decision reversal module 144 may include software and/or logic to provide the functionality for identifying and generating a decision reversal based on patterns and meta-patterns from knowledge graph data and the training datasets in the decision reversal platform 130. In some implementations, the decision reversal module 144 determines whether to reverse a previously made decision based on new information available. For example, the oldest transaction that has been currently identified as part of a cluster of fraudulent transactions may have been the lone transaction at the time of the decision making. However, based on cluster properties, as determined by the cluster hierarchy module 142, the decision reversal module 144 may identify the transaction as part of a cluster of fraudulent transactions. For example, the transaction may include a contextual fragment, such as an IP address, that has been associated with suspected fraud. Thus, the decision reversal module 144 would generate the decision to reverse the originally made decision.

A data association module 146 may include software and/or logic to provide the functionality for generating new data associations in transactional graph data and/or knowledge graph data in the decision reversal platform 130. In some implementations, the data association module 146 may generate new data associations in the knowledge graph based on a cluster hierarchy module 142 grouping a transaction into a particular cluster based on a particular data fragment. Similarly, in other implementations, the data association module 146 may generate a new data association with transactional graph data based on the cluster hierarchy module 142 grouping a transaction into a particular cluster based on a particular data fragment. In an embodiment, one or more business rules may be generated within the data association module 146 to determine what criteria must be satisfied for the data association to be generated between transactional graph data and/or knowledge graph data.

Other variations and/or combinations are also possible and contemplated. It should be understood that the system 100 illustrated in FIG. 1 is representative of an example system and that a variety of different system environments and configurations are contemplated and are within the scope of the present disclosure. For example, various acts and/or functionality described herein may be moved from a server to a client, or vice versa, data may be consolidated into a single data store or further segmented into additional data stores, and some implementations may include additional or fewer computing devices, services, and/or networks, and may implement various functionality client or server-side. Furthermore, various entities of the system may be integrated into a single computing device or system or divided into additional computing devices or systems, etc.

In the example of FIG. 1, the entities of the system 100, such as client devices 106 and the decision reversal platform 130 may be, or may be implemented by, a computing device including a processor, a memory, applications, a database, and network communication capabilities similar to that described below with reference to FIG. 2. In some implementations, each one of the entities 106 and 130 of the system 100 may be a hardware server, a software server, or a combination of software and hardware.

Figure 2:
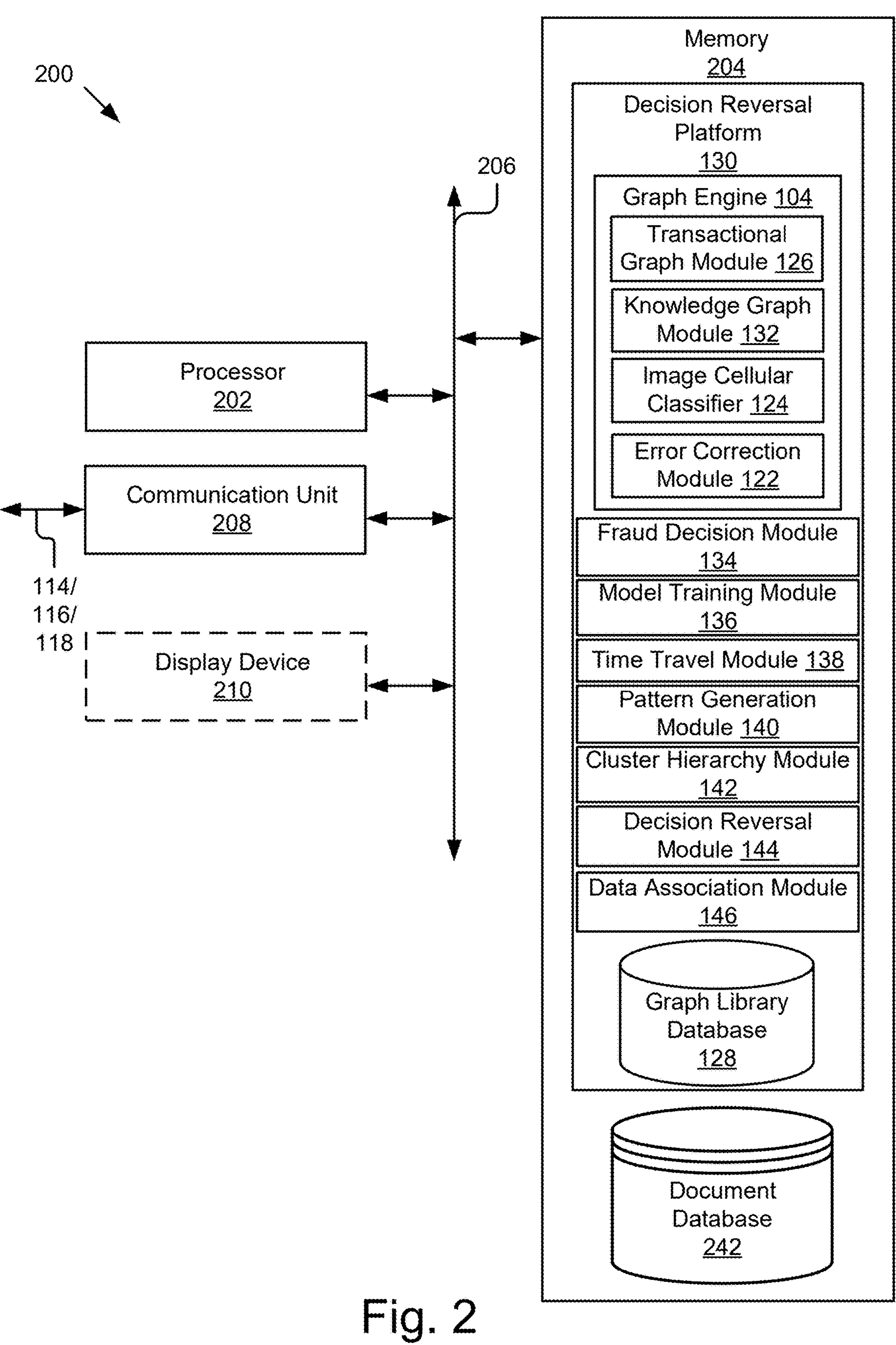
FIG. 2 is a block diagram of an example computing device in accordance with some implementations.

FIG. 2 is a block diagram of an example computing device 200 including an instance of the decision reversal platform 130. In the illustrated example, the computing device 200 includes a processor 202, a memory 204, a communication unit 208, an optional display device 210, and a data storage 242. In some implementations, the computing device 200 is a cloud-based platform, the memory 204 stores the decision reversal platform 130, and the communication unit 208 is communicatively coupled to the network 102 via signal line 118. In some implementations, the computing device 200 is a client device 106, which may occasionally be referred to herein as a user device, and the client device 106 optionally includes at least one sensor (not shown), and the communication unit 208 is communicatively coupled to the network 102 via signal line 114. In other implementations, the computing device 200 is a server, and the server and the communication unit 208 is communicatively coupled to the network 102 via signal line 116.

The processor 202 may execute software instructions by performing various input/output, logical, and/or mathematical operations. The processor 202 may have various computing architectures to process data signals including, for example, a complex instruction set computer (CISC) architecture, a reduced instruction set computer (RISC) architecture, and/or an architecture implementing a combination of instruction sets. The processor 202 may be physical and/or virtual and may include a single processing unit or a plurality of processing units and/or cores. In some implementations, the processor 202 may be capable of generating and providing electronic display signals to a display device, supporting the display of images, capturing, and transmitting images, and performing complex tasks and determinations. In some implementations, the processor 202 may be coupled to the memory 204 via the bus 206 to access data and instructions therefrom and store data therein. The bus 206 may couple the processor 202 to the other components of the computing device 200 including, for example, the memory 204, the communication unit 208.

The memory 204 may store and provide access to data for the other components of the computing device. The memory 204 may be included in a single computing device or distributed among a plurality of computing devices. In some implementations, the memory 204 may store instructions and/or data that may be executed by the processor 202. The instructions and/or data may include code for performing the techniques described herein. For example, in one implementation, the memory 204 may store an instance of the document evaluator 226. The memory 204 is also capable of storing other instructions and data, including, for example, an operating system, hardware drivers, other software applications, databases, etc. The memory 204 may be coupled to the bus 206 for communication with the processor 202 and the other components of the computing device 200.

The memory 204 may include one or more non-transitory computer-usable (e.g., readable, writeable) device, a static random access memory (SRAM) device, a dynamic random access memory (DRAM) device, an embedded memory device, a discrete memory device (e.g., a PROM, FPROM, ROM), a hard disk drive, an optical disk drive (CD, DVD, Blu-ray™, etc.) mediums, which can be any tangible apparatus or device that can contain, store, communicate, or transport instructions, data, computer programs, software, code, routines, etc., for processing by or in connection with the processor 202. In some implementations, the memory 204 may include one or more of volatile memory and non-volatile memory. It should be understood that the memory 204 may be a single device or may include multiple types of devices and configurations. In some implementations, the memory 204 stores a document database 242. In some implementations, the document database 242 is stored on a portion of the memory 204 comprising a network accessible storage device.

The communication unit 208 is hardware for receiving and transmitting data by linking the processor 202 to the network 102 and other processing systems. The communication unit 208 receives data and transmits the data via the network 102. The communication unit 208 is coupled to the bus 206. In one implementation, the communication unit 208 may include a port for direct physical connection to the network 102 or to another communication channel. For example, the computing device 200 may be a server, and the communication unit 208 may include an RJ45 port or similar port for wired communication with the network 102. In another implementation, the communication unit 208 may include a wireless transceiver (not shown) for exchanging data with the network 102 or any other communication channel using one or more wireless communication methods, such as IEEE 802.11, IEEE 802.16, Bluetooth® or another suitable wireless communication method.

In yet another implementation, the communication unit 208 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another implementation, the communication unit 208 may include a wired port and a wireless transceiver. The communication unit 208 also provides other connections to the network 102 for distribution of files and/or media objects using standard network protocols such as TCP/IP, HTTP, HTTPS, and SMTP as will be understood to those skilled in the art.

The display device 210 is a conventional type such as a liquid crystal display (LCD), light emitting diode (LED), touchscreen, or any other similarly equipped display device, screen, or monitor. The display 210 represents any device equipped to display electronic images and data as described herein. In some implementations, the display device 210 is optional and may be omitted.

It should be apparent to one skilled in the art that other processors, operating systems, inputs (e.g., keyboard, mouse, one or more sensors, etc.), outputs (e.g., a speaker, display, haptic motor, etc.), and physical configurations are possible and within the scope of the disclosure.

Figure 3A:
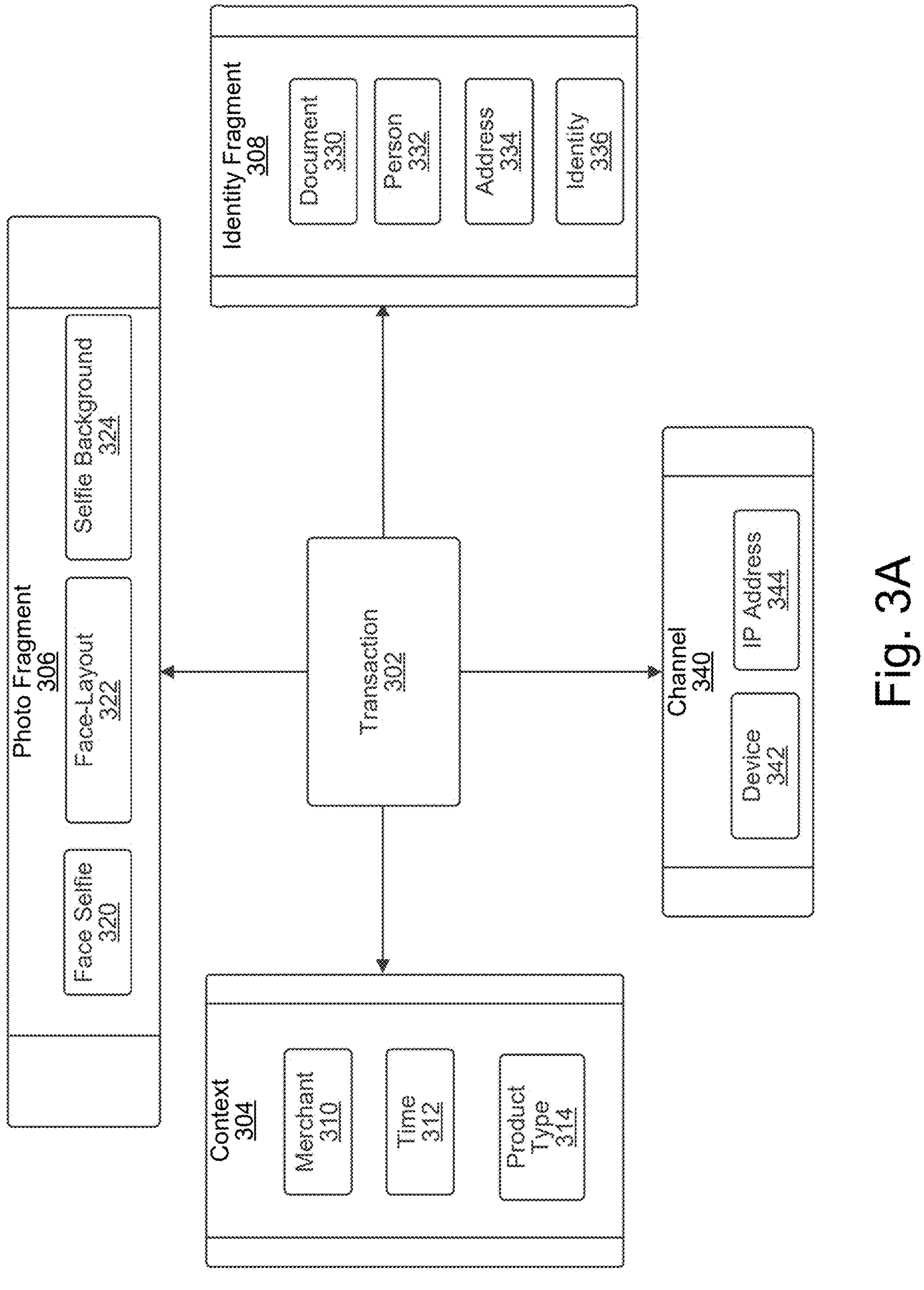
FIG. 3A is a block diagram of an example transaction with accompanying data fragments in accordance with some implementations.
Figure 3B:
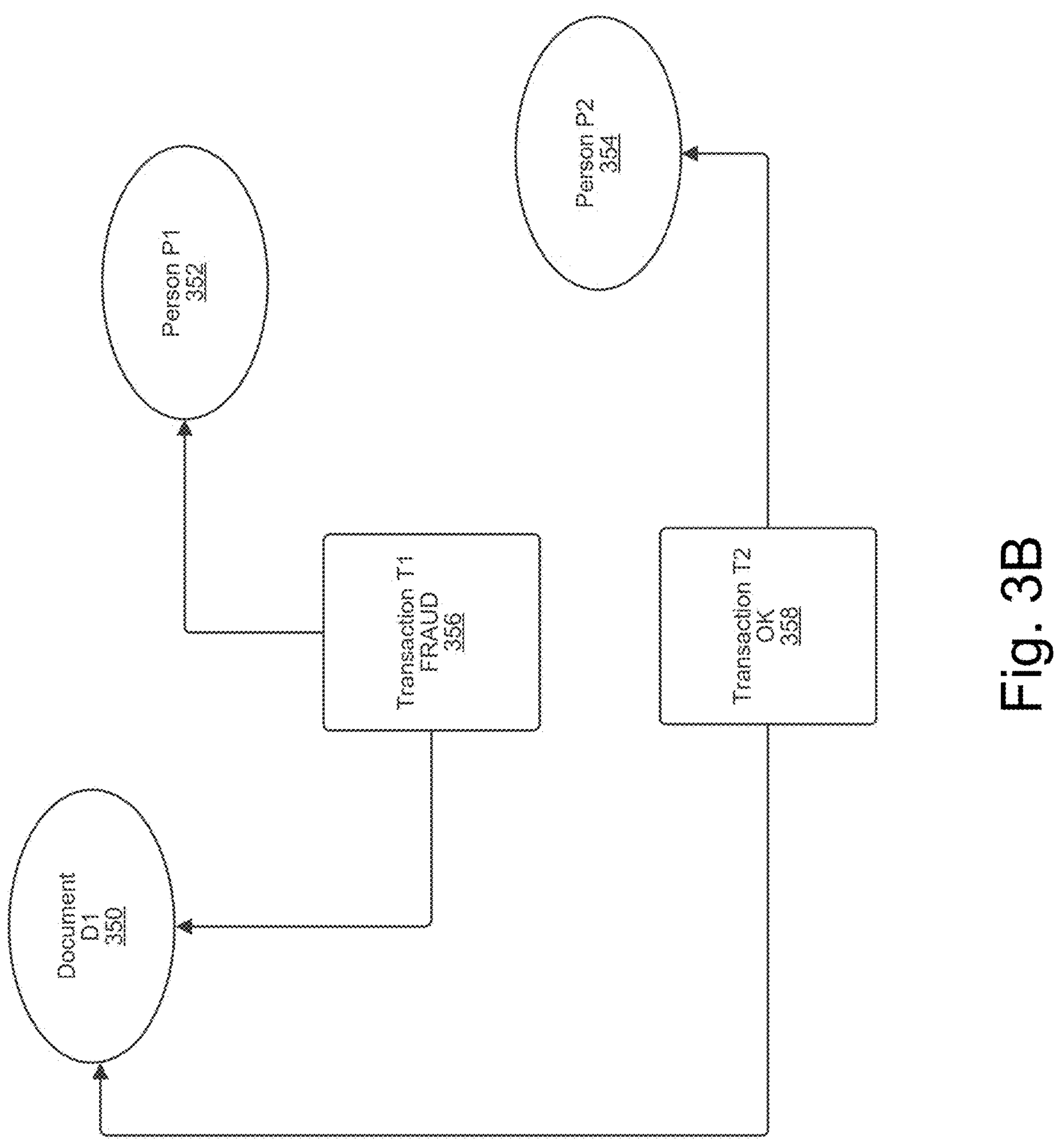
FIG. 3B is a block diagram of an example transaction pattern in accordance with some implementations.

FIG. 3A is a block diagram of an example transaction with accompanying data fragments in accordance with some implementations. A transaction 302 may include context 304 that includes information related to a merchant 310, time 312, and/or product type 314. For example, transaction 302 may be at a kiosk for verifying the identity of a person at a ticketed event, such as a wrestling match for only attendees over the age of 21. Thus, the merchant 310 may be the ticketing company that issued the ticket such as "TICKETMASTER" while the time 312 may be captured in a particular timestamp format, such as "12/15/2023 07:45:42 PM" and the product type 314 may be "ADULT TICKET OVER 21". This context 304 data may be captured and encoded into the transactional graph by the transactional graph module 126 of the graph engine 104 within the decision reversal platform 130, in an embodiment. Other types of context 304 may be later associated in a transaction graph and stored in a database in association with the transaction 302. For example, the location of the kiosk that performed the transaction 302 may be later added as a context 304 data fragment. This location data may then be associated with a weather conditions database that includes the weather conditions at the event at the time of the transaction 302, for example. These weather conditions may be added as context 304 later in time, for example. Other examples of context 304 that may be added later in time includes knowledge of known fraudulent transactions, method of scan, other biometric information captured, and the like.

The example transaction 302 may also be associated in a database with photo fragments 306, such as a face selfie 320, a face-layout 322, and a selfie background 324. For example, at the wrestling match, a user may be asked to present the ticket for scanning by a kiosk and take a selfie photo through an application on the user's client device 106. Thus, the face selfie 320 may be the photo fragment 306 data that is presented in conjunction with the scanning of the ticket at the kiosk. In another embodiment, the face selfie 320 may be photo data captured at the kiosk of the user presenting the ticket. The other portions of the photo fragment 306 may be derived from the photo captured at the kiosk and/or captured at the client device 106. For example, the face-layout 322 may measure specific attributes of a face, such as the location of eyes in relation to the mouth of the face and a series of approximate distances within the face-layout 322. As another example, the face-layout 322 may capture a particular orientation of the face in relation to the camera, such as an angle, tilt, and other metrics defined by administrators. Selfie background 324 may include the portions of the image that represent the background of the selfie that do not include the person being captured. For example, the selfie background 324, in this example of a kiosk capturing the photo, may include the backdrop of the scene behind the user. In other embodiments, where a scan of a document is presented instead of a photo of the user, the background 324 may include the negative space or portions of the photo that are not associated with the document. Any number of photo fragments 306 may be captured and/or generated in association with a transaction 302.

Further, the transaction 302 may be associated in a database with identity fragments 308, including document 330, person 332, address 334, and/or identity 336. Returning to the example above, the transaction 302 may be a scan of a ticket to a sporting event. The transaction 302 may be associated with a document 330, such as a California Driver's License. That document may have a unique number, such as a Driver's License number. The transaction 302 may also be associated with a specific person 332. That person 332 may be associated with identifying information and/or other data attributes, such as date of birth, place of birth, full legal name, and the like. An address 332 may also be associated with a transaction 302, such as a billing address, a mailing address, an address listed on the document 330, and so forth. An identity 336 may also be associated with the transaction 302, such as a person purchasing the ticket, in the above example, versus the person attending the event. Other identity 336 information, such as a social security number (SSN), or biometric information tied to an identity 336, such as an iris scan, fingerprint scan, previous image scans of ID documents, and/or other information tied to an identity, may also be associated in a database as identity fragments 308 and/or identity 336 even though not pictured here.

The transaction 302 may also be associated with channel 340 fragments in a database, such as device 342 and IP address 344 identifiers. For example, a device 342 may include device fingerprint information, such as unique identifiers such as the MAC Addresses and serial numbers assigned to machine hardware, as well as other diverse and stable information that can be gathered, such as browser fingerprint information, networking protocol information and the like. Example devices 342 may include a server that interacts with a kiosk in capturing and/or facilitating a transaction 302. As another example, a device 342 may include the kiosk itself, in an embodiment.

FIG. 3B is a block diagram of an example transaction pattern in accordance with some implementations. In this example transaction pattern, a document D1 350 is being used in two separate transactions, transaction T1 356 and transaction T2 358, which are trying to authenticate person P1 352 and person P2 354, respectively. In this example transaction pattern, the same document D1 350, such as a California Driver's License, may be used to authenticate two different people, person P1 352 and person P2 354. As illustrated in FIG. 3B, transaction T1 356 is marked as "FRAUD" and transaction T2 358 is marked as "OK". This example transaction pattern illustrates a typical pattern that may emerge over time in a transactional graph. This "One Document Multiple Persons" pattern may be abbreviated as "ODMP" herein.

Figure 3C:
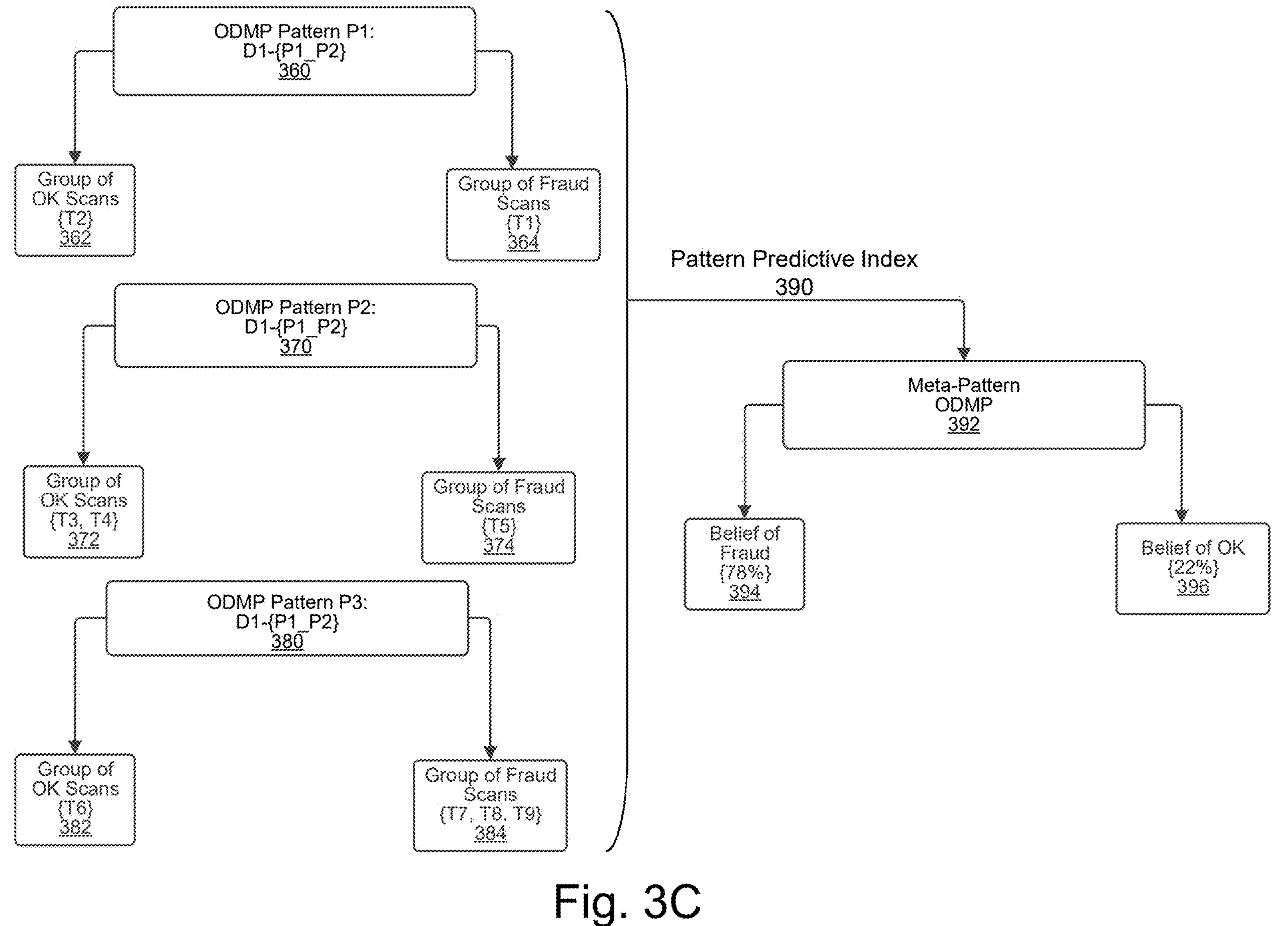
FIG. 3C is a block diagram of an example data flow diagram of a pattern predictive index in accordance with some implementations.

FIG. 3C is a block diagram of an example data flow diagram of a pattern predictive index in accordance with some implementations. As shown in FIG. 3C, multiple clusters of the same pattern may emerge over time, each with different transactions. ODMP Pattern P1 360 illustrates document D1 being used for persons P1 & P2 as being connected to two separate groups, a group of OK scans 362 that includes transaction T2 and a group of Fraud scans 364 that includes transaction T1. ODMP Pattern P2 370 illustrates document D1 being used for persons P1 & P2 as being connected to two other groups, a group of OK scans 372 that includes transactions T3 and T4 and a group of Fraud scans 374 that includes transaction T5. ODMP Pattern P3 380 illustrates document D1 being used for persons P1 & P2 as being connected to two additional groups, a group of OK scans 382 that includes transaction T6 and a group of Fraud scans 384 that includes transactions T7, T8 and T9. Using a pattern predictive index 390, a new meta-pattern ODMP 392 may emerge that includes a belief of fraud 394 at 78% and a belief of OK 396 at 22%.

Figure 4A:
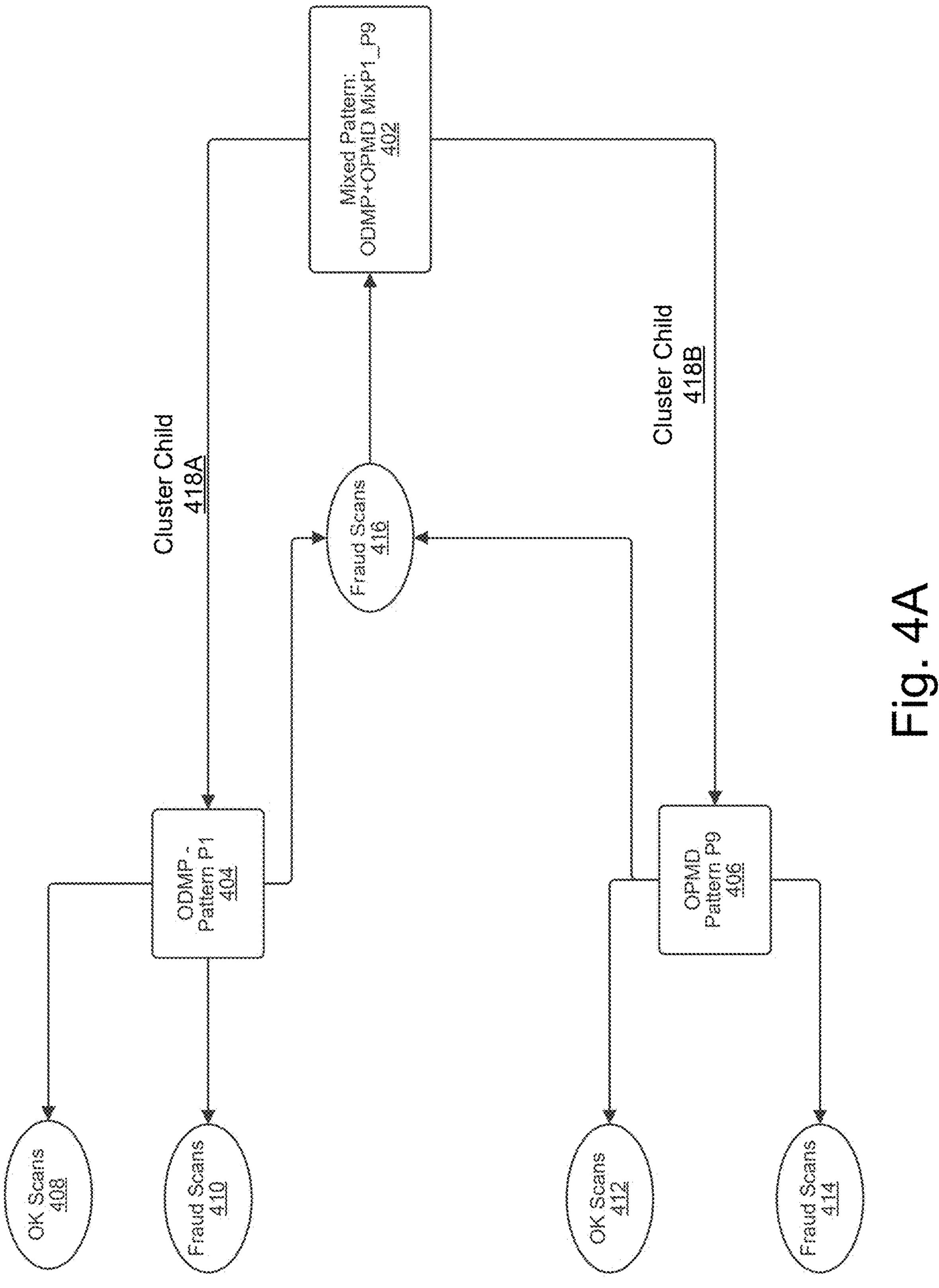
FIG. 4A is a block diagram of example cluster children for a mixed pattern in a knowledge graph in accordance with some implementations.

FIG. 4A is a block diagram of example cluster children for a mixed pattern in a knowledge graph in accordance with some implementations. An ODMP Pattern P1 404 includes OK scans 408 and Fraud scans 410. An OPMD ("One Person—Multiple Documents") Pattern P9 406 includes OK scans 412 and Fraud scans 414. These two patterns may be identified as related based on commonly shared Fraud scans 416, in an embodiment. Thus, a new mixed pattern: ODMP+OPDM Mix P1_P9 402 may emerge that includes a first cluster child 418A that includes the ODMP Pattern P1 404 as well as a second cluster child 418B that includes the OPMD Pattern P9 406.

Figure 4B:
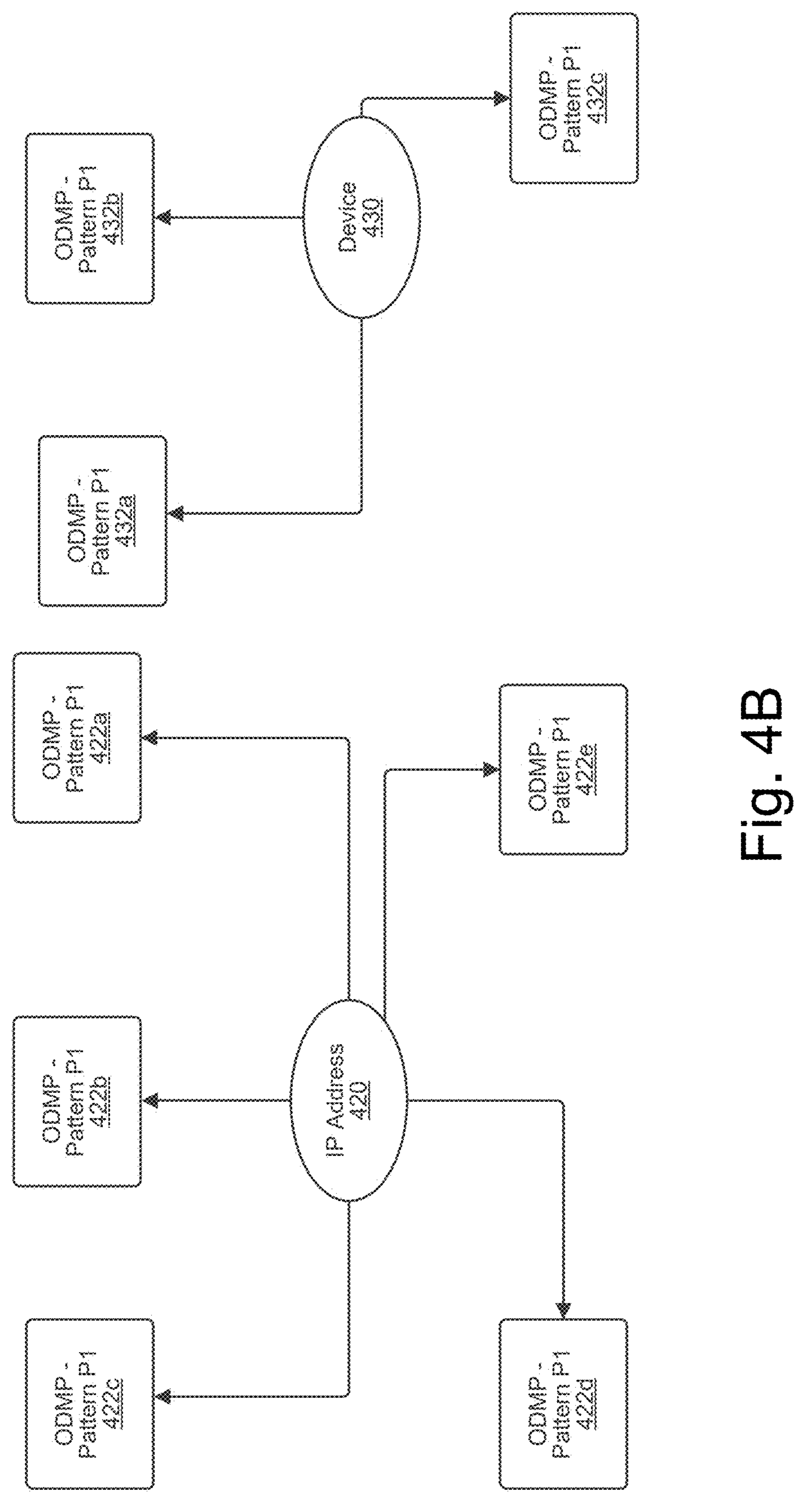
FIG. 4B is block diagram showing channel fragments associated with patterns in accordance with some implementations.

FIG. 4B is a block diagram showing channel fragments associated with patterns in accordance with some implementations. As an example, FIG. 4B illustrates an IP address 420 being connected to five (5) different ODMP Patterns P1 422. In other words, the same IP address 420 may have been used in a transaction included in those 5 patterns. Similarly, a device 430 is illustrated as connected to three (3) different ODMP Patterns P1 432. Various device-identifying information fragments, captured as channel fragments 340, may be used to connect a device 430 to the transactions included in the three ODMP Patterns P1 432.

Figure 4C:
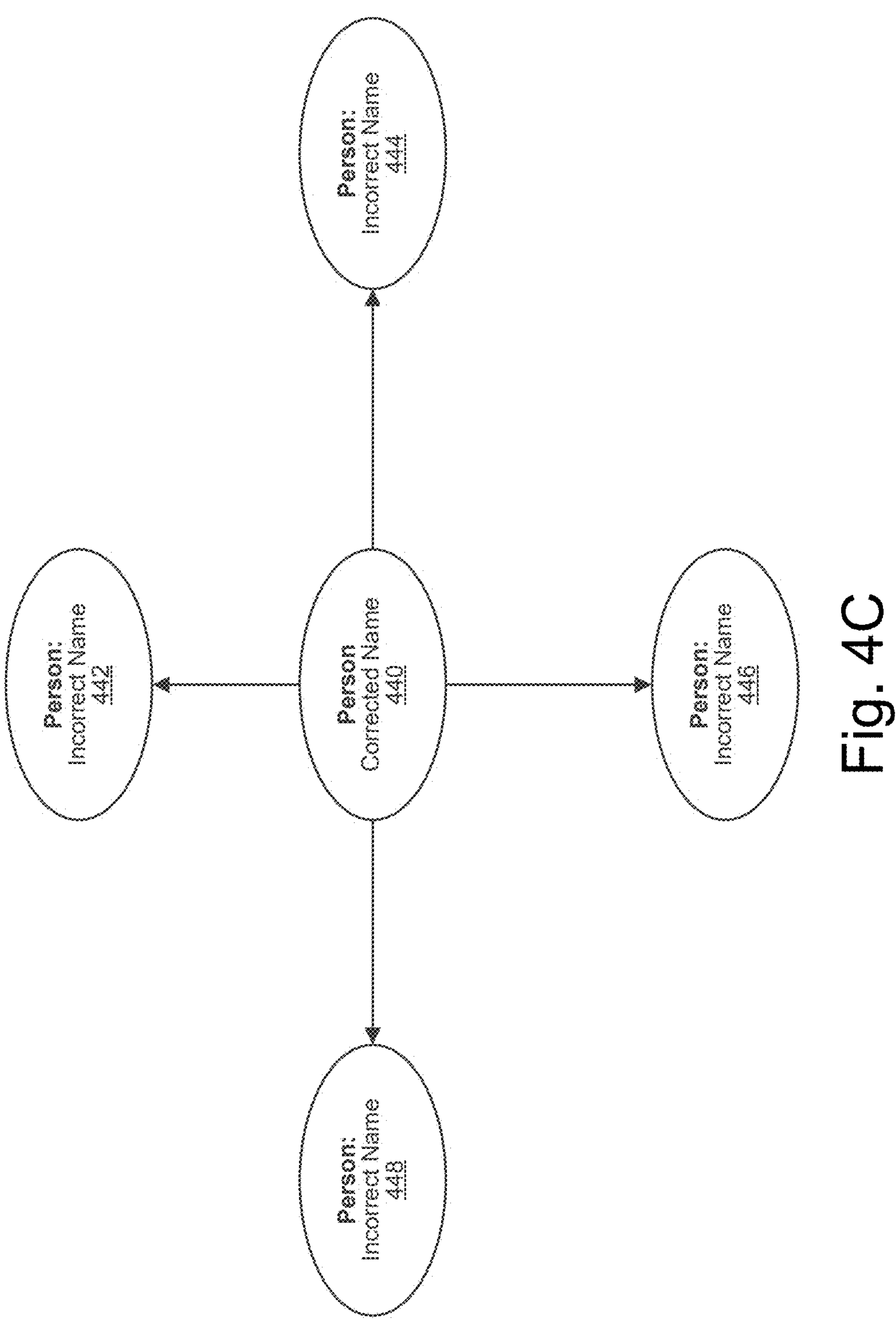
FIG. 4C illustrates an example of a multidimensional view of a Person, including associated names, in accordance with some implementations.

FIG. 4C illustrates an example of a multidimensional view of a Person, including associated names, in accordance with some implementations. In this example, a Person with a corrected name 440 may be connected to the same or different persons with incorrect names 442, 444, 446, and 448, as illustrated by FIG. 4C. For example, if the correct name of a person is "John Michael Smith," that name information may be stored in a "Person" identity fragment in a database, such as a knowledge graph. However, the incorrect names that may emerge for that same person may include "John Micheal Smith" due to a typographical error in the middle name, "Jonathan Smith" that includes an alternate spelling of the first name that may be incorrect, and "J M Smith" that does not include the full first and middle names of the same person. In each of these instances, the name may be incorrect, but the person being authenticated may still be the actual same person. In other words, these "incorrect names" may still be found to be "OK" based on the validation rules of the system, as determined by administrators of the verification system. However, other "incorrect" names may also be included here that indicate one or more fraudulent attempts to spoof a verification system. For example, returning to the example above of scanning an ID document, such as a California Driver's License, to verify the age of an attendee at a wrestling match, a person presenting a fraudulent ID may use the incorrect name of "Jay Smith" on the fraudulent ID with the same driver's license number as "John Michael Smith." Thus, a knowledge graph may be populated to associate the Person ("John Michael Smith") with the incorrect name of "Jay Smith" based on this fraudulent transaction.

Example Decision Reversal Platform

Figure 5A:
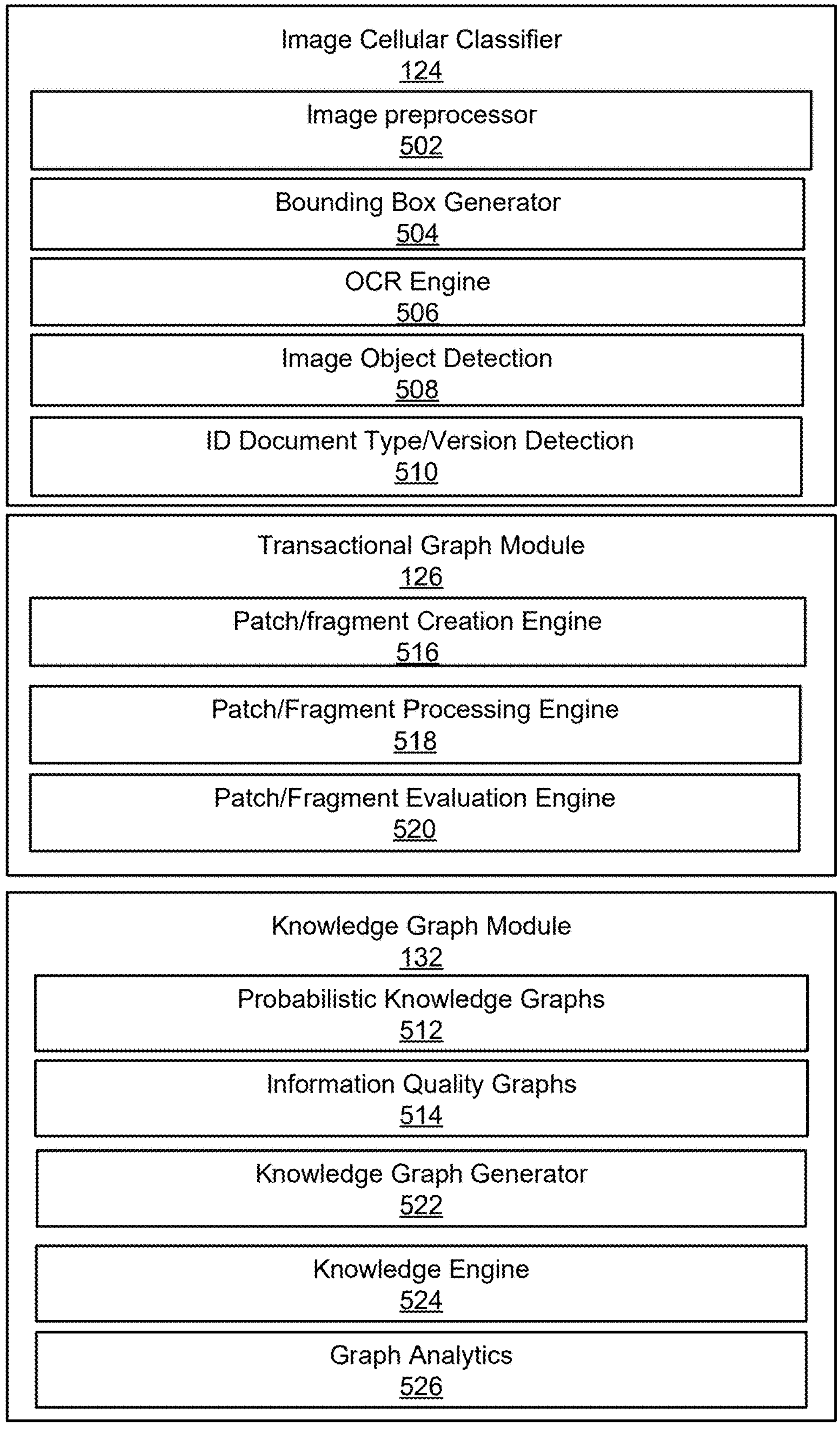
FIG. 5A illustrates examples of an image cellular classifier, a transactional graph module, and a knowledge graph module in accordance with some implementations.
Figure 5B:
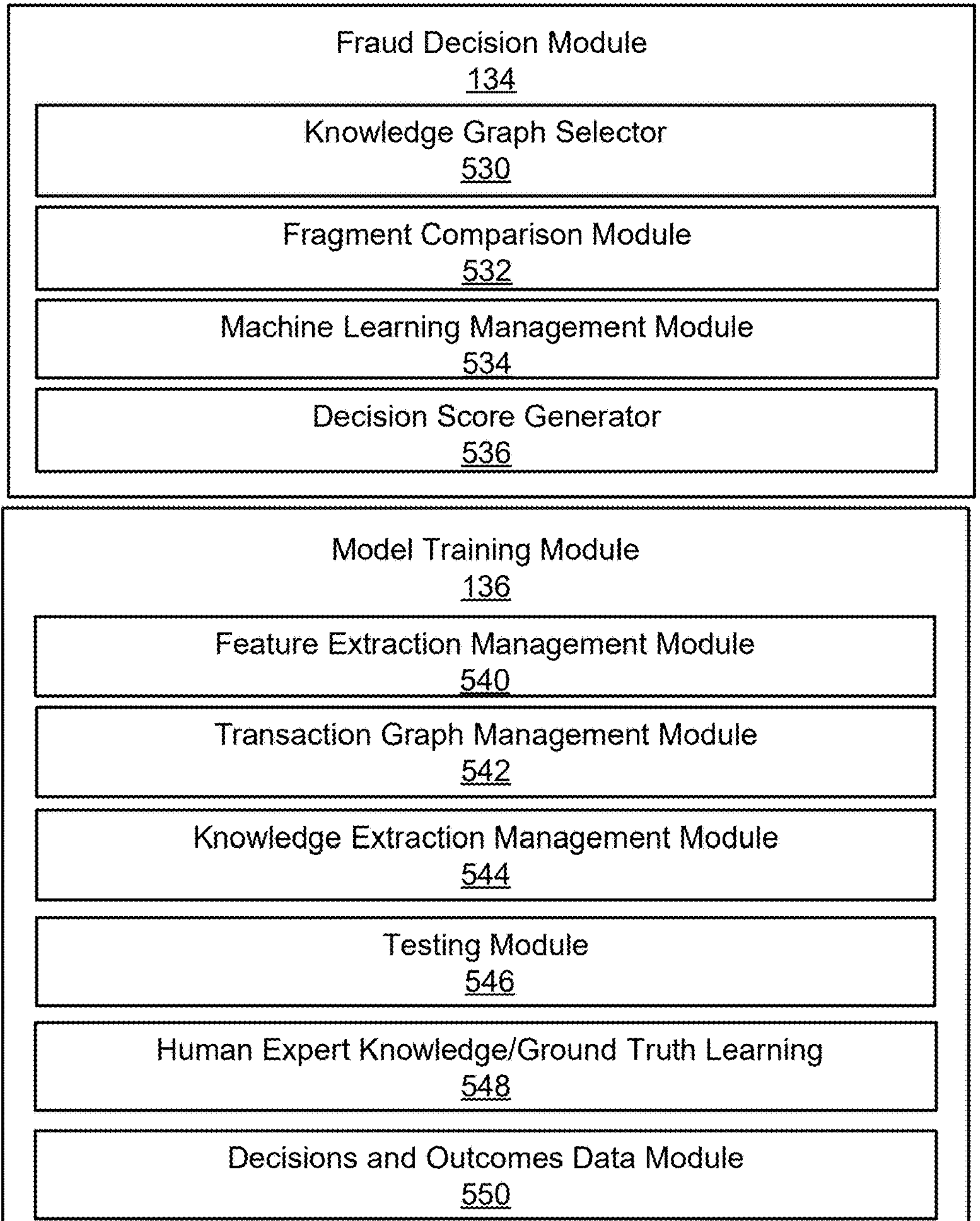
FIG. 5B illustrates examples of a fraud decision module, a model training module, and a time travel module in accordance with some implementations.
Figure 5C:
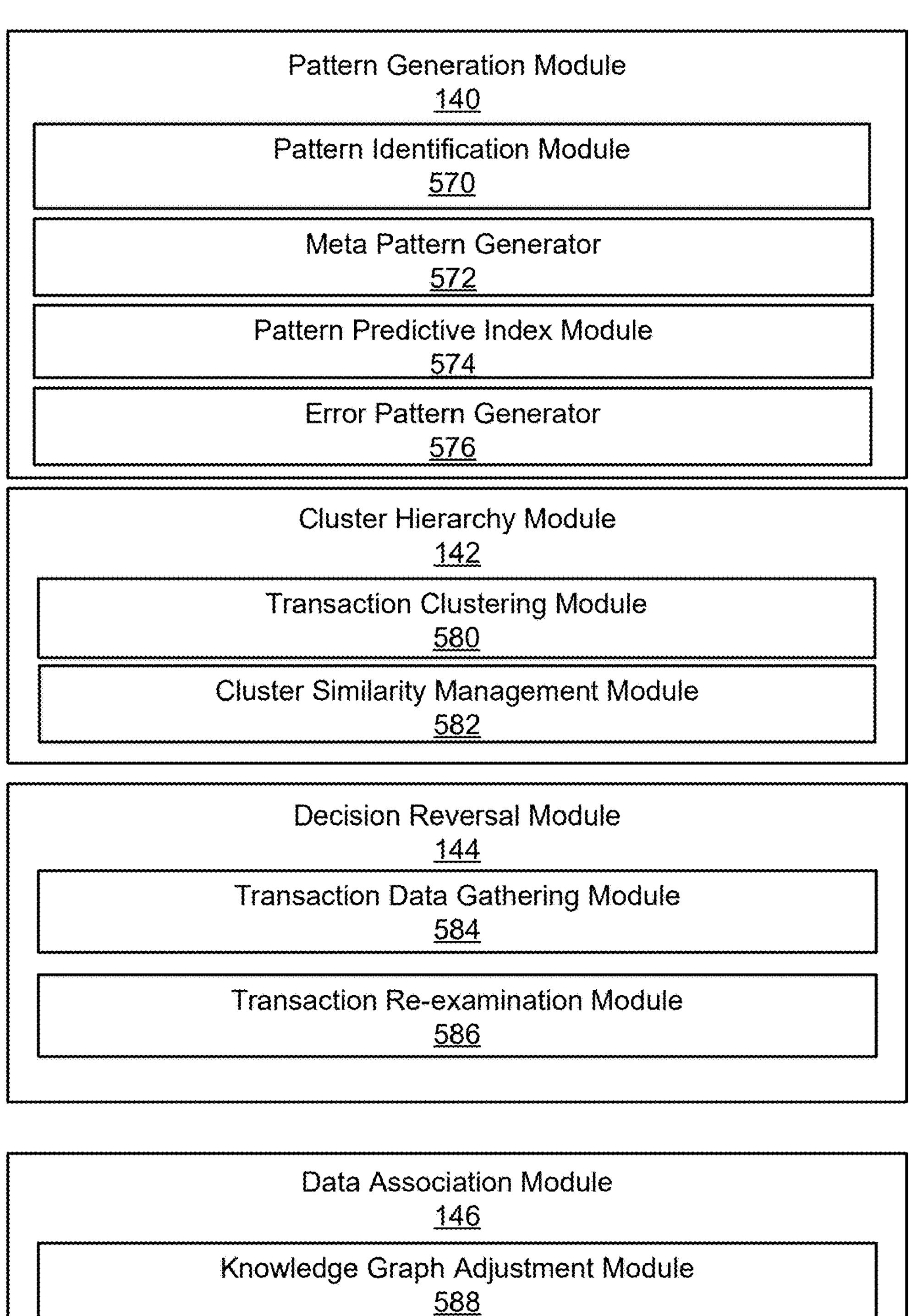
FIG. 5C illustrates examples of a pattern generation module, a cluster hierarchy module, a decision reversal module, and a data association module in accordance with some implementations.

FIGS. 5A, 5B, and 5C illustrate high-level examples of modules within a decision reversal platform 130. FIG. 5A illustrates examples of an image cellular classifier 124, a transactional graph module 126, and a knowledge graph module 132 in accordance with some implementations.

An image cellular classifier 124 may include an image preprocessor 502, a bounding box generator 504, an OCR engine 506, an image object detection 508, and an ID document type/version detection 510. A transactional graph module 126 may include a patch/fragment creation engine 516, a patch/fragment processing engine 518, and a patch/fragment evaluation engine 520. A knowledge graph module 132 may include probabilistic knowledge graphs 512, information quality graphs 514, a knowledge graph generator 522, a knowledge engine 524, and graph analytics 526.

As described above, the image cellular classifier 124 may include software and/or logic to provide the functionality for applying a cellular grid to a received image and classifying portions, or fragments, of the image. An image preprocessor 502 is provided to process images of IDs that are received. In one implementation, a bounding box generator/504 generates bounding boxes used to define patches fragments of images, where a patch may also be called a fragment. For example, for a particular type of ID, bounding boxes may be selected to generate fragments. However, more generally, as discussed below, patch creation functions may include semantic segmentation and/or other machine learning techniques to generate patches/fragments.

An OCR engine 506 may be included to detect text. The OCR engine 506 converts text in an image into machine-readable text. In some implementations, when the OCR engine 506 executes, the presence of text is recognized in the input image. In some implementations, the OCR engine 506 derives information describing one or more of a size, position, orientation (e.g., horizontal, or vertical), and textual content of each bounding box. For example, the size and position of the bounding box around a driver's license (DL) number could be represented by a set of coordinates associated with the four vertices of the bounding box and the content could be represented as "I1234568." In some implementations, the OCR engine 506 may assign a bounding box to individual characters. An image object detection engine 508 detects objects in images, such as faces. In one implementation, an ID document type/version detection engine 510 performs at least some steps to determine the ID document type/version, such as detecting the state of a driver's license or the nation associated with a national ID card or passport.

A transactional graph module 126 may include software and/or logic to provide the functionality for managing and ingesting different types of data involved in a transaction. For example, a received image of a document representing an ID may be a transaction. In some embodiments, a human expert knowledge processor (not pictured) may be provided to support human curated information. For example, in one implementation, human experts curate documents to provide multidimensional view into IDs to generate a hierarchical multidimensional view of identification documents based at least in part on human curated expert knowledge. Human experts may also curate other information related to providing ground truth data and/or defining a gold standard for a good image.

A patch creation engine 516 creates patches for an image. It may be used as a source of information, bounding box information. However, it may select a subset of bounding boxes. Also, it may utilize machine learning models or semantic processing in creating patches, as discussed below in more detail. A patch processing engine 518 and patch evaluation engine 520 may be included to perform patch processing and patch evaluation functions, respectively.

The transactional graph generated by the transactional graph module 126 is an important component of graph engine 104 because it serves as a dynamic repository of transaction-related data. Multi-class deep learning models that label images are hard to test and normally require human experts to tag errors and validate results. However, the transactional graph provides an automated means to identify class identification errors and also provides explanations on which part of the ID is deviant from the expectation of all images of a particular ID class, thus eliminating the need to use human experts for testing and validation. Designed to populate information obtained from the transactions, decisions, and outcomes associated with the transactions, the transactional graph may extract information from the ID such as name, document number (passport, Driver's License (DL) number, etc.), address, and date of birth. Additionally, the transactional graph may identify quality issues and identify parts of the ID image where the quality issues are found. This is an important factor that allows for rejection of the image or some of the extraction results because IDs may be manipulated by changing the text, faces, and/or copying and pasting text from another image. These types of manipulations can be identified based on the fragment properties and matching the new images to the knowledge base that may also include a wide array of data sources, in some embodiments, such as IP address classes and device types, among other relevant data. The transactional graph uses this information to contextualize transactions from a merchant perspective, providing a comprehensive and multi-dimensional view of each transaction.

One of the primary functions of the Transactional Graph is to store additional context information that is deemed relevant for understanding the transaction. This includes, but is not limited to, the background which the document is submitted with (e.g., the negative space). For instance, in the preprocessing of an ID document, the document picture is first separated from the background image (i.e., the desk in which the ID physically sits on when taking the photo). In this implementation, the background image will be transformed into a mathematical representation (i.e., a vector). This background vector will be compared when a new ID document verification transaction arrives. If two unrelated documents share the variant background vector, the system will create a fraud alert. FIGS. 9A-9C illustrate this fraudulent scenario. Fraudsters typically take one picture with a specific background and then change the details of the ID document, but rarely will not change the background. In the real-world, even when the same person is submitting the same ID in the same environment, the background images across different submissions will be slightly different because of slight changes in camera angle, lighting, and movements in the background. This additional context information aids in providing a more nuanced understanding of the transaction, thereby enabling a more accurate and detailed analysis.

A knowledge graph module 132 may include software and/or logic to provide the functionality for generating and providing access to one or more knowledge graphs. A knowledge base, such as database 128, stores and provide access to information for implementing a knowledge graph with a knowledge graph schema. It supports providing information for a workflow for a given ID type/version, a knowledge graph schema, a set of patch fragment creation functions, a set of patch processing functions and a set of evaluation functions. For example, a workflow may be assigned to a specific document type (e.g., a California Driver's License) that is different than a workflow for a different type of ID (e.g., a Canadian driver's license from the province of Quebec). In other words, the patch creation functions, patch processing functions, and evaluation functions are tailored for a particular type/version of ID. The knowledge base may include an extensible grammar to learn properties of patches and implement an orchestration workflow for each ID type and version. The knowledge base support workflows coordinating the processes for selecting patches, processing patches, and evaluating patches for a particular type of ID.

The knowledge graph module 132 may also include a knowledge graph generator 522 that include software and/or logic to provide the functionality for generating one or more knowledge graphs. Different types of knowledge graphs may be generated, including probabilistic knowledge graphs 512 and information quality graphs 514. Different graph analytics 526 may also be generated by the knowledge graph module 132, such as relationships between recognized text and describable fragments on a particular document type. For example, the text fragments of "California" and "USA" in relation to the text fragment of "DL" may have a very specific mathematical relationship described as a vector, in an embodiment. That mathematical relationship is an example of a graph analytics 526, in an embodiment. An example of different relationships of recognized text fragments of a California Driver's License is shown in FIGS. 6A-6D and FIGS. 7A-7F.

The knowledge graph module 132 is a core component of the graph engine 104 that leverages the information stored in the transactional graph to generate multiple knowledge graphs. These knowledge graphs are not mere replicas of the Transactional Graph but are sophisticated structures that take into account various factors such as the quality of the information, the context of the transaction, and the outcomes of the transaction.

The knowledge graph module 132 operates by extracting and generalizing information from the transactional graph. It identifies and isolates various information fragments associated with each transaction and creates a comprehensive picture of what fragments have been seen and the nature of the decisions and outcomes associated with each fragment over time. This process of information extraction and generalization is not a one-time operation but is a continuous process that evolves with each new transaction, thereby ensuring that the knowledge graphs are constantly updated and refined.

One of the distinguishing features of the knowledge graph module 132 is its ability to associate transaction outcomes across different transaction contexts in a probabilistic fashion. This means that the knowledge graph module does not merely record the outcomes of transactions but also quantifies the risks and uncertainties associated with each transaction. It does this by analyzing the transaction outcomes in the context of the overall transaction environment, taking into account factors such as the quality of the information, the context of the transaction, and the outcomes of previous similar transactions. By associating transaction outcomes in this probabilistic manner, the knowledge graph module 132 is able to quantify risks and uncertainties, thereby providing a more nuanced and detailed understanding of each document type, providing a more detailed knowledge base for new transactions.

In summary, the knowledge graph module 132 plays a pivotal role in the Graph Engine 104 by transforming raw transaction data into actionable knowledge. It does this by generating multiple knowledge graphs based on the information quality, transaction context, and outcomes, and by associating transaction outcomes across different transaction contexts in a probabilistic fashion for quantifying risks and uncertainties. The knowledge graph module 132 thus serves as a powerful tool for making informed identity and ID verification decisions.

Figure 6A:
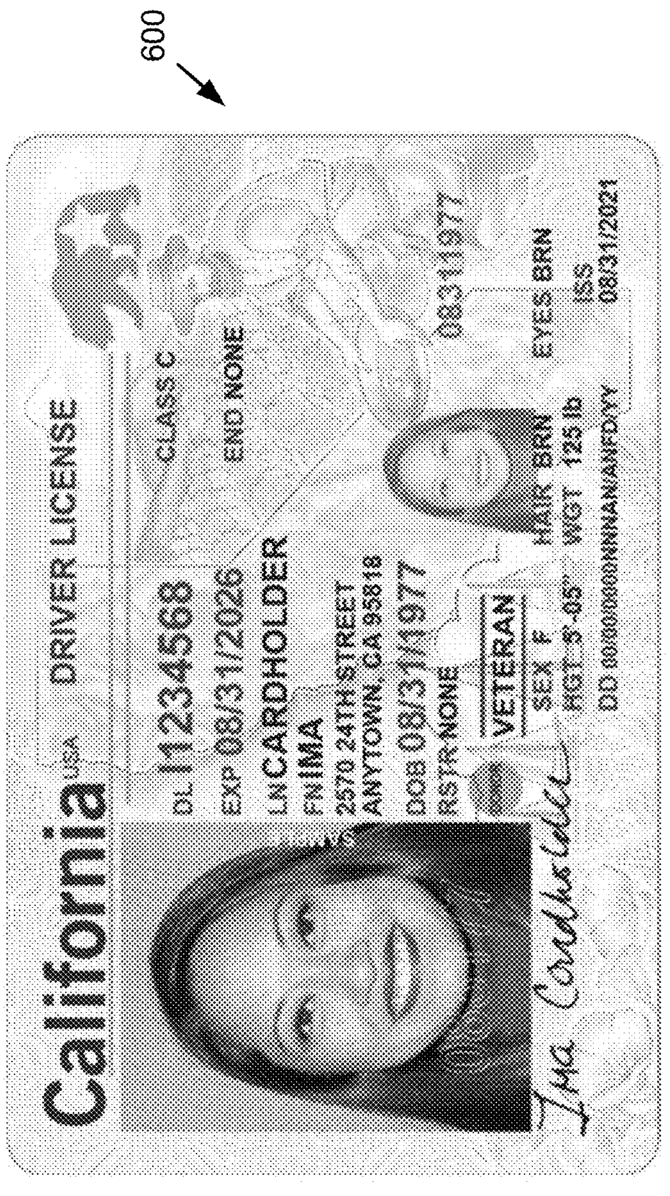
FIG. 6A is an image of an example of a California Driver's License, which is an example document in accordance with some implementations.

The design of the Knowledge graph provides a structured and comprehensive representation of the ID image. The Knowledge graph includes a node for every ID class, each of which is connected to cellular fragment nodes. These cellular fragment nodes represent the individual image fragments that are obtained from the ID image during the fragmentation process. Each cellular fragment node is a distinct element within the Knowledge graph, representing a specific section or element within the ID image. A global golden archetype may be generated for each document type, as shown in FIG. 6A. An ID from California may have specific data fragments, including context fragments, channel fragments, photo fragments, and identity fragments.

The process of breaking down every ID image into small image fragments, referred to as cellular fragments, is important in the operation of the Graph Engine 104. This process involves analyzing the ID image and identifying distinct sections or elements within the image. Each of these sections or elements is then isolated and treated as a separate image fragment, or cellular fragment. This process is carried out using advanced image processing techniques and algorithms, which are designed to accurately and efficiently identify and isolate the various sections or elements within the ID image.

Once the ID image has been broken down into cellular fragments, these fragments are then aggregated into subsets. This aggregation process involves grouping together fragments that share similar characteristics or properties. The specific criteria used for grouping the fragments can vary depending on the specific requirements of the ID verification process. However, in general, the fragments are grouped into three main categories: Text Fragments, Describable Image Fragments, and Non-describable Image Fragments.

Text Fragments are fragments that contain text elements, such as names, addresses, or identification numbers. These fragments are typically processed using text extraction techniques, which are designed to accurately and efficiently extract the text content from the fragment. The extracted text is then used for further analysis and comparison with the information stored in the Knowledge Graph.

Describable Image Fragments are fragments that contain visual elements that can be described using standard image descriptors. These descriptors may include color histograms, texture descriptors, shape descriptors, or other similar descriptors. The describable image fragments are typically processed using image processing techniques, which are designed to extract the relevant descriptors from the fragment. The extracted descriptors are then used for further analysis and comparison with the information stored in the Knowledge Graph.

Non-describable Image Fragments are fragments that contain visual elements that cannot be easily described using standard image descriptors. These fragments are typically processed using more advanced image processing techniques, such as deep learning models or other machine learning techniques. These techniques are designed to extract complex and high-dimensional features from the fragment, which can then be used for further analysis and comparison with the information stored in the Knowledge Graph.

Cellular fragments may be connected to nodes representing text and image fragments by the knowledge graph module 132. The text fragment nodes represent the text elements within the ID image, such as names, addresses, or identification numbers. The image fragment nodes, on the other hand, represent the visual elements within the ID image, such as facial images or other identifiable features.

By connecting the cellular fragment nodes to the text and image fragment nodes, the Knowledge graph is able to capture and represent the complex relationships and associations between the various elements within the ID image. Text fragments may be expressed as cellular fragment nodes that have a specific relationship and associations between the various elements within the ID image. Example cellular fragments are illustrated in FIGS. 7A-7F.

In addition to the cellular fragment nodes and the text and image fragment nodes, the Knowledge graph also includes nodes for every masking function. A masking function is a mathematical operation that is applied to the ID image to isolate specific portions of the image, thereby creating a negative fragment. Each masking function is created as a node within the Knowledge graph and is connected to the ID class to which it can be applied. This allows the Knowledge graph to represent not just the ID image and its constituent elements, but also the processes and operations that are applied to the ID image during the fragmentation and analysis process.

By incorporating nodes for every ID class, cellular fragment, text and image fragment, and masking function, the Knowledge graph provides a comprehensive and structured representation of the ID image. This design enables the Graph Engine to perform a detailed and nuanced analysis of the ID image, thereby enhancing the accuracy and effectiveness of the ID verification process.

Furthermore, by breaking down the ID image into cellular fragments and aggregating these fragments into subsets, the Graph Engine is able to perform a detailed and nuanced analysis of the ID image. This analysis enables the Graph Engine to accurately identify and categorize anomalies in the ID image, thereby enhancing the accuracy and effectiveness of the ID verification process.

A distinctive feature of the Graph Engine is the concept of a negative fragment. A negative fragment is a specific type of image fragment that is obtained by subtracting portions of the image using a masking function. The masking function is a mathematical operation that is applied to the image to isolate specific portions of the image, thereby creating the negative fragment. This process allows for a more detailed and nuanced analysis of the ID image, enabling the detection of subtle anomalies that may not be visible in the original image.

The process of creating negative fragments involves both human knowledge and deep learning models. Human knowledge is used to identify the portions of the image that are to be subtracted to create the negative fragment. This involves a detailed understanding of the structure and content of the ID image, as well as the specific requirements of the ID verification process. For instance, human experts may identify specific sections of the ID image, such as the text elements or the facial image, that are to be subtracted to create the negative fragment.

Deep learning models, on the other hand, can be used to automate the process of subtracting the recognized identified portions of the image, such as facial recognition using machine learning models. These models are trained to accurately and efficiently perform the subtraction operation, thereby creating the negative fragment. The deep learning models are also used to identify Text and Image fragments for an ID class and to create masking functions. These masking functions are mathematical operations that are applied to the image to isolate specific portions of the image, thereby creating the negative fragment.

By combining human knowledge and deep learning models, the Graph Engine 104 is able to create negative fragments in a precise and efficient manner. These negative fragments provide a detailed and nuanced view of the ID image, enabling the detection of subtle anomalies that may not be apparent in the original image. This enhances the accuracy and effectiveness of the ID verification process, thereby improving the overall performance of the Graph Engine 104.

FIG. 5B illustrates examples of a fraud decision module 134, a model training module 136, and a time travel module 138 in accordance with some implementations. A fraud decision module 134 may include a knowledge graph selector 530, a fragment comparison module 532, a machine learning management module 534, and a decision score generator 536. A fragment comparison module 532 may be provided to check on deviations in invariant relationships, learn to distinguish manipulations by fraudsters, and identify quality issues. A knowledge graph selector 530 may be used to select the one or more knowledge graphs and infer rules to support the fraud decision module 134. In one implementation, graph analytics 526 that were generated based on learned fragment relationships are used to select knowledge graphs by the knowledge graph selector 530 and/or compare fragments by the fragment comparison module 532. In one implementation, insights from the graph analytics 526 are provided to the knowledge engine 524, which in turn provides rules for the fraud decision module 134. In another implementation, a machine learning management module 534 may modify weights of a machine learning model based on user input, user feedback, decisions, outcomes, and the like. In yet another implementation, the machine learning management module 534 may include continuous retraining, as described above, based on new knowledge graphs and/or updated knowledge graphs. In one implementation, the fraud decision module 134 utilizes a combination of causal reasoning and neural networks to build a decision score generator 536 that generates scores for fraud decisions regarding transactions.

The decision score generator 536 may generate combined scores from different fragment evaluations. For example, one or more risk scores may be generated for a transaction and used to generate an overall fraud risk score. Based on each piece of new evidence, the risk score of a transaction may be evaluated and re-evaluated.

Figure 6B:
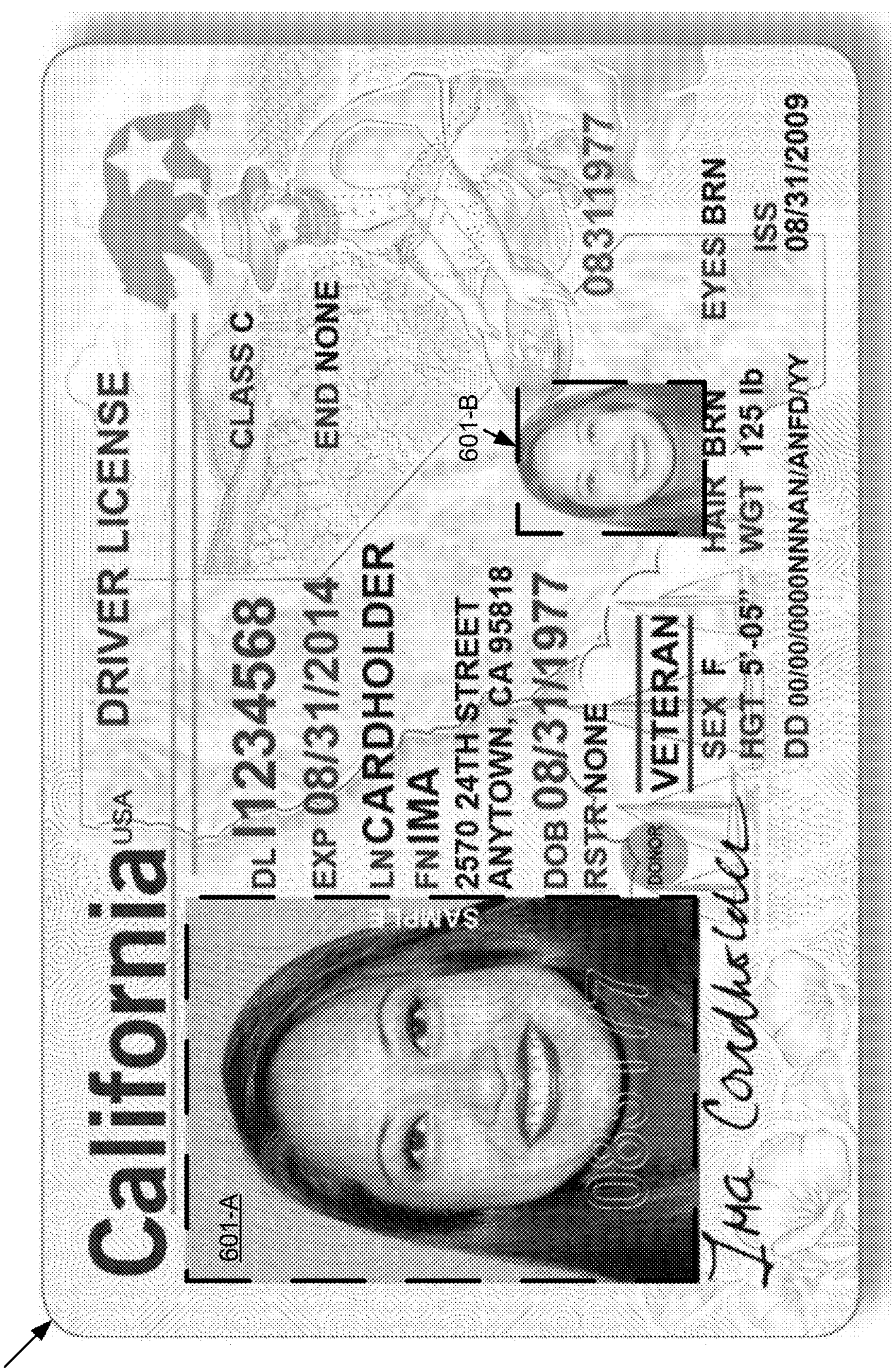
FIG. 6B is an image of the example California Driver's License with examples of bounding boxes superimposed in accordance with some implementations.
Figure 6C:
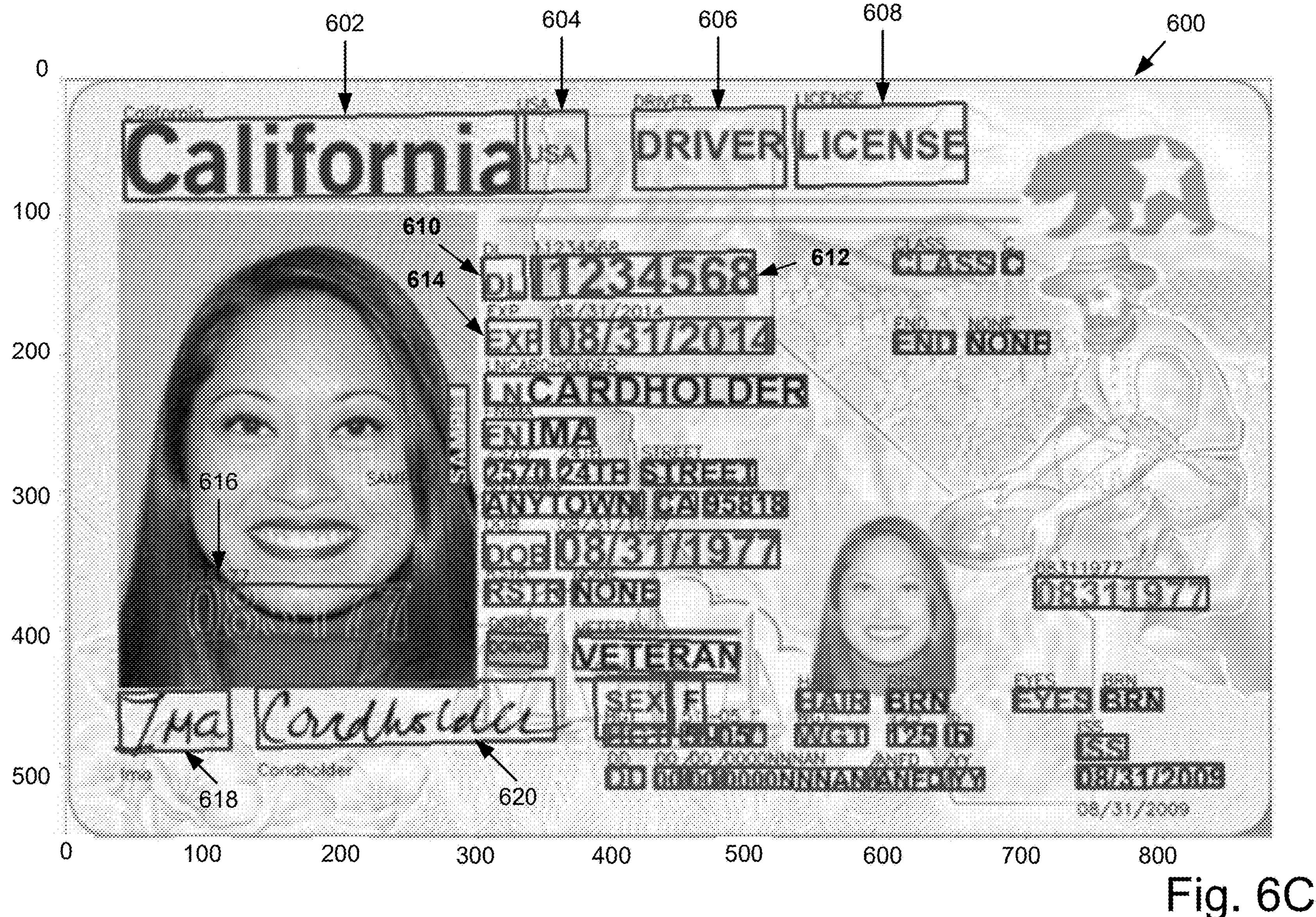
FIGS. 6C and 6D illustrate an image of the example California Driver's License with examples of bounding boxes superimposed and the underlying data fragments extracted in accordance with some implementations.

The model training module 136 may include a feature extraction management module 540, a transaction graph management module 542, a knowledge extraction management module 544, a testing module 546, a human expert knowledge/ground truth learning module 548, and a decisions and outcomes data module 550. A feature extraction management module 540 may include software and/or logic to provide the functionality for managing the feature extractions of images. For example, in one implementation, field level and character level characteristics can be extracted as features based on a gold standard of ID samples from each ID document. In one example, individual characters which appear in a specific field of an ID will be captured across many IDs and represented as a vector. As an example, a license number for a California license may have multiple features, including characters, fonts, shapes, and colors of these characters that are different from other characters in other fields of the same ID. As seen in FIG. 6A, the field level characteristics for “DL”, or Driver License number, includes red font on a background of a portion of the state of California. As shown in FIG. 6C, this data (element 612) may be captured through the feature extraction management module 540 when training the model to determine whether the ID is authentic. Character level features may also be captured across a dataset of numerous IDS with the same ID type. For example, the character "8" at the end of the license number can be compared to numerous appearances of the character "8" in other licenses. A model may be generated to build a golden standard of character "8" for this specific field of this specific ID type. The golden standard can be converted into a vector or a mathematical representation using different techniques. If a fraudster makes even small changes in the shape, color, composition, and pixel distribution of any letter of a document and submits it to the knowledge graph for evaluation, the character level golden standard set will be able to detect these differences and flag them as anomalies to detect the fraudulent attempt.

A transaction graph management module 542 may include software and/or logic to provide the functionality for managing transaction graph data in the decision reversal platform 130. For example, transaction graph data may be stored as knowledge graph data in a database 128, in an embodiment. In other instances, transaction graph data may also be stored as historical transactions in the database 128.

A knowledge extraction management module 544 may include software and/or logic to provide the functionality for extracting knowledge from the transaction graph data and other data sources. For example, an ID may include a photo of a face and a particular name, perhaps in Arabic symbols. If a fraudster submits an image of another ID with the same face and different text fragments, such as a different name in Arabic symbols, the knowledge extraction management module 544 may flag this as a fraud alert because the same image is used with different text fragments for the name field in different documents. This knowledge may be extracted based on a rule that only one face may be associated with one name, for example. Other rules may be used to generate and extract more knowledge by the model training module 136.

In one implementation, a testing module 546 may include software and/or logic to provide the functionality for generating synthetic image fragments for testing and training purposes. For example, the testing module 546 may generate synthetic image fragments having variations in features such as fine variations in bounding box size or box location, as one example. For example, the testing module 546 may generate variations in image fragment that are imperceptible to the naked eye but that a fraudster may accidentally include in a fake ID.

A human expert knowledge/ground truth learning module 548 may include software and/or logic to provide the functionality for supporting human curated information. For example, in one implementation, human experts curate documents to provide multidimensional view into IDs to generate a hierarchical multidimensional view of identification documents based at least in part on human curated expert knowledge. For example, dimensions that could be added include ID type, ID class, issuing body, issue period, issued population size, etc. The result is a hierarchical graph structure, in an embodiment. Human experts may also curate other information related to providing ground truth data and/or defining a gold standard for a good image. For example, the human expert may determine what is the background image in a gold standard ID, such as the state of California in the background of the California Driver's License. Various user interfaces may be generated by the human expert knowledge/ground truth learning module 348 to support human curated information gathering for use in training machine learning models as well as in calibrating probabilistic knowledge graphs.

A decisions and outcomes data module 550 may include software and/or logic to provide the functionality for incorporating decisions and outcomes data into training models in the decision reversal platform 130. For example, decisions taken and the actual outcomes of a transaction may be incorporated as training data for different types of models, including machine learning models and probabilistic models.

The time travel module 138 may also include a knowledge graph version manager module 560 that may include software and/or logic to provide the functionality for managing different versions of knowledge graphs. For example, different decisions may be made that diverge with graph evolution. With new information being received about transactions, the knowledge graph may evolve such that a previously verified transaction may need to be marked as fraudulent due to its association with known clusters of fraudulent transactions, for example. Any number of data fragments may be used to identify clusters of transactions as fraudulent, as determined by a fraud decision module 134. This information may be used to train neural networks to make predictive decisions based on a probabilistic understanding of the graph evolution, in an embodiment.

FIG. 5C illustrates examples of a pattern generation module 140, a cluster hierarchy module 142, a decision reversal module 144, and a data association module 146 in accordance with some implementations.

A pattern generation module 140 may include a pattern identification module 570, a meta pattern generator 572, a pattern predictive index module 574, and an error pattern generator 576. A pattern identification module 570 may include software and/or logic to provide the functionality for identifying patterns that emerge in the decision reversal platform 130. For example, administrators of the decision reversal platform 130 may identify and/or input patterns that may be evidence of fraudulent behavior. "Belief of the world" patterns may incorporate into business rules one or more various beliefs held by the administrators, such as an identity is unique and is associated with one person, and that a strong association of an identity feature, such as biometrics (e.g., facial features), and all likenesses of the same face belong to the same person. These "beliefs of the world" may be converted into the following graph patterns created by administrators of the platform 130, such as one document—multiple persons/names, one identity—multiple persons/names, one face—multiple persons/names, one person/name—multiple identities (e.g., social security numbers, CURP numbers, CPF, etc.), one person/name—multiple documents, one face—multiple names, and so on.

A meta pattern generator 572 may include software and/or logic to provide the functionality for generating meta-patterns in the decision reversal platform 130. Meta-patterns may be generated based on credible evidence linking a particular sub-graph pattern of identity fragments with a collection of known or eventually known fraudulent transactions. For example, a meta-pattern of fraudster domain knowledge pattern could be generated as a result of recognizing the same IP address being used in association with validated multiple distinct identity fraudulent transactions when multiple unvalidated "OK" transactions occur within a short interval of time. Domain knowledge patterns may also include higher order cluster connectivity transactions as identified by the cluster hierarchy module 142 in which specially connected components of clusters reveal evidence of the meta-pattern.

Additionally, meta-patterns may be implicitly derived from examining vast collections of transactions and encoding meta-pattern behavior if it is seen overwhelmingly in fraud transactions and seldom seen or never seen in trusted transactions. For example, by clustering and condensing patterns into single nodes in the knowledge graph, meta-patterns may be generated based on the probabilistic data of verified versus fraudulent scans using a pattern predictive index, as illustrated in FIG. 3C.

A pattern predictive index module 574 may include software and/or logic to provide the functionality for creating predictive models for meta-pattern generation in the decision reversal platform 130. In an embodiment, patterns may be generated by known users whose transactional behavior has been validated over a longer period of time. A behavior pattern that establishes trust may include a series of transactions and the different meta-patterns can be coded as a meta-pattern distribution likelihood. A rule may be implemented such that any meta-patterns that violate or are not part of a known meta-pattern distribution or falls outside the likelihood is deemed to require attention and evaluation. Establishment of trust may also be evaluated by examining a statistically significant number of sample transactions that fall across the entire meta-pattern distribution likelihood and proven to be genuine with a very high level of confidence. Similarly, meta-patterns of violation, when validated with a substantial portion of samples, will be coded as an anti-behavioral pattern that establishes a violation of trust. A meta-pattern of an anti-behavioral pattern may be established by aggregating transactional fragments by label types and then assessing the linkage of the meta-pattern with known/validated fraudulent transaction patterns and trusted transaction patterns.

An error pattern generator 576 may include software and/or logic to provide the functionality for generating error patterns in the decision reversal platform 130. For example, as data is generated around errors in making decisions, that data may be used to train and build a machine learning model to find error patterns to create new rules.

A cluster hierarchy module 142 may include a transaction clustering module 580 and a cluster similarity management module 582. A transaction clustering module 580 may include software and/or logic to provide the functionality for generating clusters of transactions in the decision reversal platform 130. Clusters of transactions may be generated based on a characteristic of the transaction, such as a data fragment, that is shared between the transactions. As an example, transactions that have the same channel fragment of an IP address may be clustered into a group by the transaction clustering module 580.

A cluster similarity management module 582 may include software and/or logic to provide the functionality for determining a similarity between clusters generated in the decision reversal platform 130. As clusters are generated by the transaction clustering module 580, a similarity between clusters may be managed by the cluster similarity management module 582. For example, a cluster generated based on transactions sharing the same IP address may have a similarity with a cluster generated based on the same background being used in the negative space of an image submitted for verification. The cluster similarity management module 582 may use any number of methods, algorithms, and/or techniques in determining a similarity between clusters. As an example, the cluster similarity management module 582 may determine a similarity between clusters based on the characteristics of the transactions within each cluster as well as the transactions of each cluster. In an embodiment, when a similarity between two clusters reaches a predetermined threshold, the clusters may be combined into a larger cluster. Cluster management is important for decision reversal platform 130 to identify patterns and meta-patterns, in an embodiment.

A decision reversal module 144 may include a transaction data gathering module 584 and a transaction re-examination module 586. A transaction data gathering module 584 may include software and/or logic to provide the functionality for gathering transaction data in the decision reversal platform 130. For example, transaction data may be stored in a graph library database 128. The transaction data gathering module 584 may request transaction data from the graph library database 128, in an embodiment. In another embodiment, other transactional data, such as data fragments related to the transaction, may be stored in other data stores accessible through a network 102. For example, a negative space fragment captured as part of several transactions may be stored as a node in a knowledge graph in a graph library database 128. Transactional data associated with the transactions having the same negative space fragment may be gathered by the transaction data gathering module 584, in an embodiment.

A transaction re-examination module 586 may include software and/or logic to provide the functionality for determining whether to re-examine a transaction in the decision reversal platform 130. For example, an older transaction may have been initially approved as "OK" by a fraud decision module 134. However, over time, the older transaction may be clustered into a group of transactions based on having the same IP address in a short time period. The transaction re-examination module 586 may include a set of business rules to determine whether to re-examine the older transaction. In another embodiment, a score may be generated by the fraud decision module 134 that incorporates new information, such as the older transaction being included in a cluster that is determined to be likely fraudulent. In a further embodiment, the transaction re-examination module 586 may periodically request a score be generated by the fraud decision module 134 based on the information available about the older transaction as determined by the transaction data gathering module 584. In this way, the decision reversal module 144 may efficiently gather the information required to reverse a prior decision in the decision reversal platform 130.

A data association module 146 may include a knowledge graph adjustment module 588. A knowledge graph adjustment module 588 may include software and/or logic to adjust or modify information captured in a knowledge graph stored in the decision reversal platform 130. As new information is generated and/or gathered, the knowledge graph associated with the new information may need to be adjusted. For example, the knowledge graph adjustment module 588 may incorporate new decisions made that affect older transactions as new data associations. In an embodiment, the IP address that is shared by the older transaction with a cluster of transactions marked fraudulent, as described in the example above, may be marked as an IP address of a fraudster, such that any IP address associated with the same fraudster identity is also marked as a potentially fraudulent transaction. As another example, the cluster of transactions marked as fraudulent may be associated with other data fragments, such as other identities, other devices, and/or other photo fragments, such as a negative space fragment. These data fragments may be adjusted to be marked as fraudulent by the knowledge graph adjustment module 588, in an embodiment.

The components 502, 504, 506, 508, 510, 512, 514, 516, 518, 520, 522, 524, 526, 530, 532, 534, 536, 540, 542, 544, 546, 548, 550, 560, 570, 572, 574, 576, 580, 582, 584, 586, 588 and subcomponents, sub-subcomponents, etc. thereof are communicatively coupled to one another and/or to the document database 242, database 128, and/or other data sources to perform the features and functionalities described herein.

Fraud scores may be calculated using different techniques, such as a weighted linear combination that combines the template matching anomaly score and the persistent homology score with weights. In another embodiment, a fraud score may be generated using various statistical techniques, including probabilistic models, to determine the weights of the combination. Other score generation methods may be employed in other embodiments.

Structural ID anomaly detection is discussed in a related application, titled "System and Method of Knowledge Graph Based ID Anomaly Detection," U.S. patent application Ser. No. 18/499,057, filed on Oct. 31, 2023, hereby incorporated by reference.

Driver's License Example

Figure 6D:
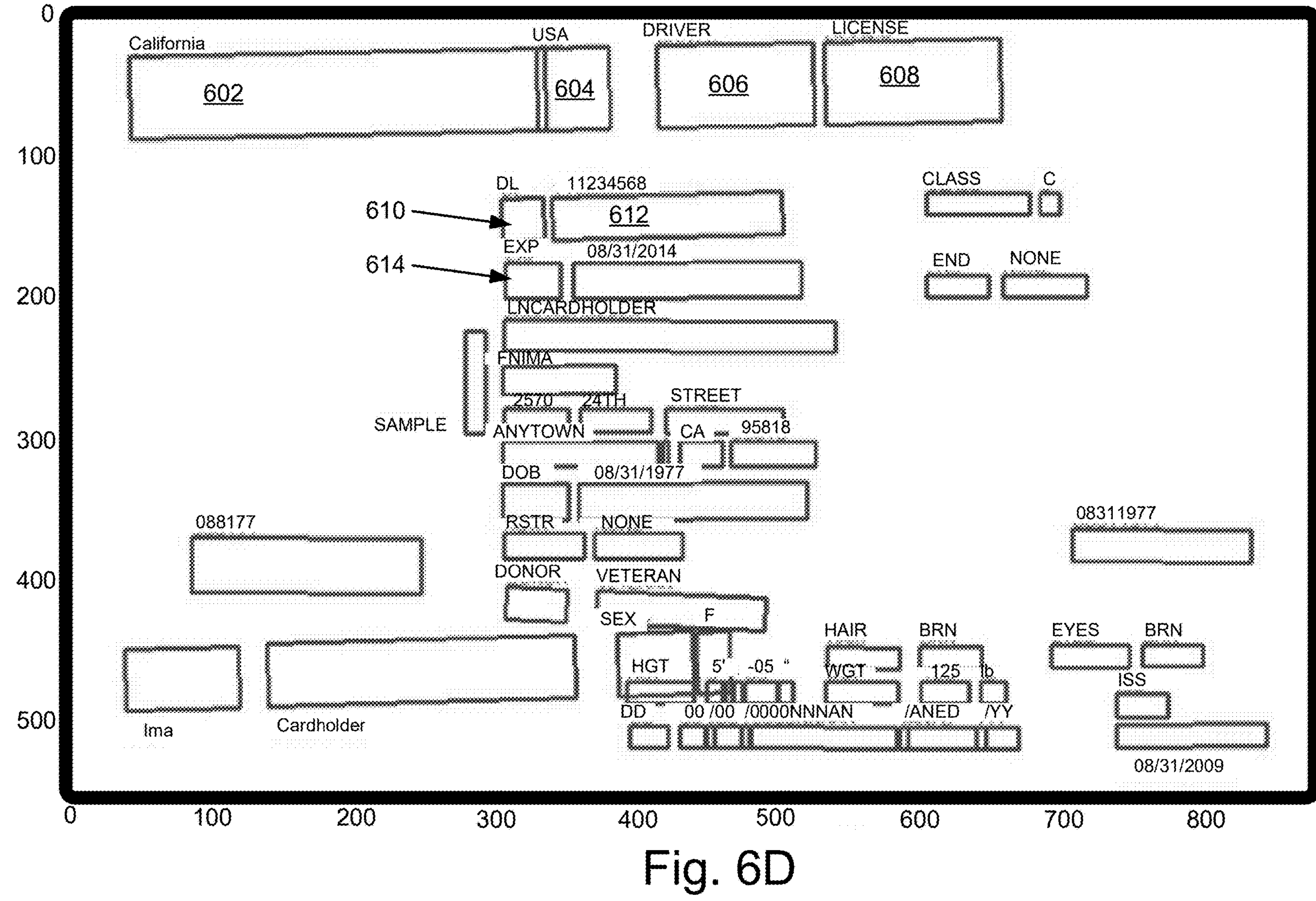

FIG. 6A shows an example of a California driver's license 600 as an illustrative but non-limiting example of an ID. As illustrated in FIG. 6B, the California Driver's License has facial image sections 601-A and 601-B, which are illustrated with bounding boxes illustrated that may include for example section like section 602 for the California section of the image, section 604 for the USA section, section 606 for "Driver", section 608 for "license, a DL section 610, an EXP section 614, signature sections 610 and 620, and an additional text section 616 superimposed in a photo image as a security measure. As illustrated in FIG. 6C, the drivers' license also has variant and invariant sections. The corresponding bounding boxes are illustrated in FIG. 6D. FIGS. 7A, 7B, 7C, 7D, 7E, and 7F illustrate examples of patches extracted.

In one implementation image would then be split into several patches, including variant patches and invariant patches. For example, for an ID type being a California Driver's License, the patches may include:

Image Patches;
Full License Image;
California License;
Invariant License Header Patch;
Invariant License Header;
Variant Name Patch;
License Holder's Name;
Variant Number Patch;
Driver's License Number;
Variant Date of Birth Patch;
Date of Birth—1;
Variant Redundant Date of Birth Patch;
Date of Birth—2;
Variant Redundant Date of Birth Patch; and
Date of Birth—3.

In this example, the patch properties have the following properties:

1. Bounding Boxes;
2. Bounding Shape;
3. Fraud Propensity;
4. Robustness for ID type identification; and
5. Feature Vectors of Ground truth.

In this example, the patch processing functions include:

1. Text Extraction;
2. Visual Encoding with DL (Deep Learning) Models (e.g., Data2VecVisionModel);
3. Encoding with Topological data analysis (TDA); and
4. Simple metrics like color histograms and threshold values.

In one implementation, examples of patch evaluation functions include:

1. Text Comparison Function;
2. Visual Encoding vector comparison with threshold ground truth vector distance;
3. Topological data analysis encoding comparison with threshold ground truth—distance metric; and
4. Comparing distributions of the color histogram.

Example Methods

Figure 8:
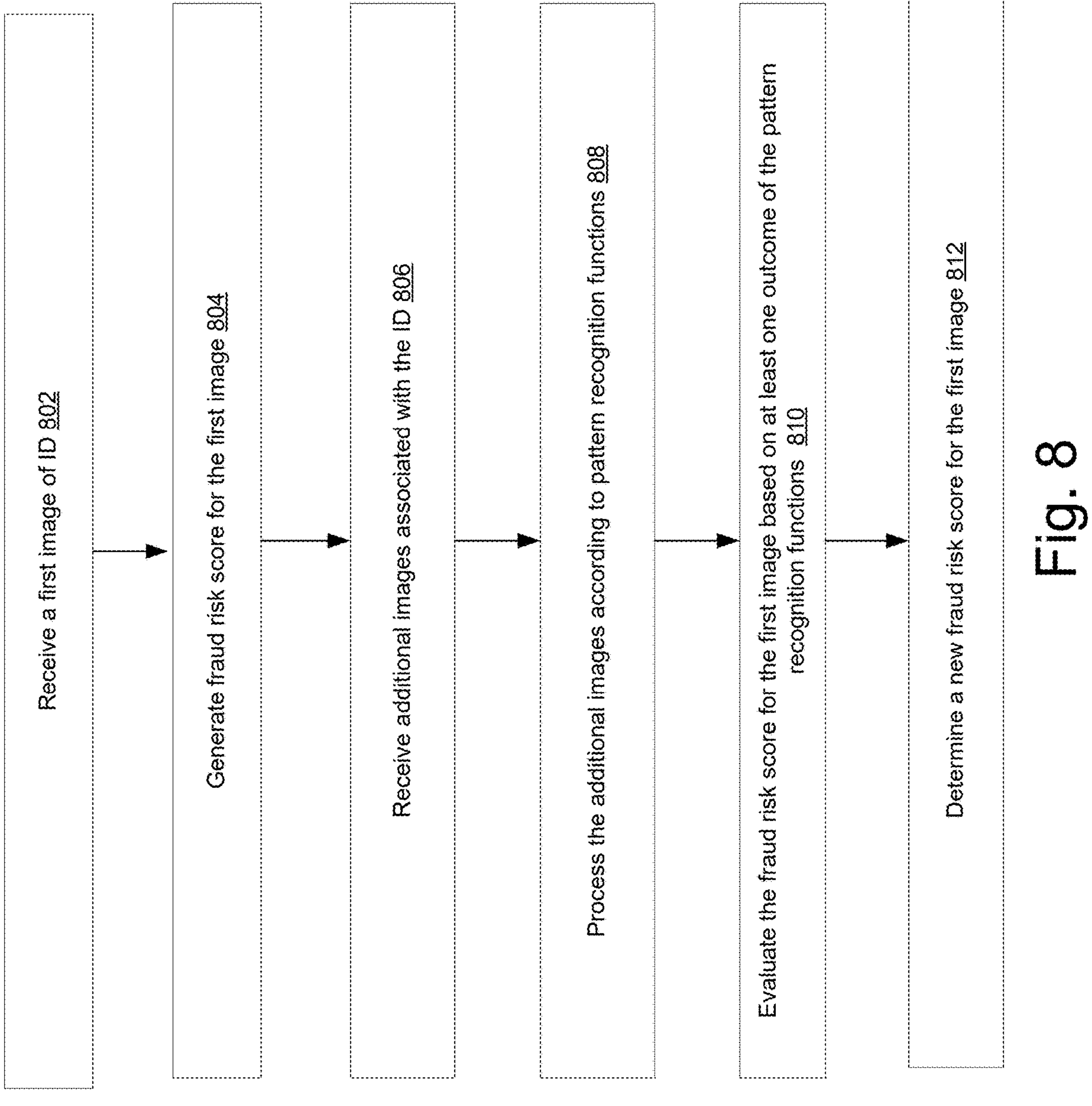
FIG. 8 illustrates an example flow chart of a method in accordance with an implementation.

It will be understood that the previously described processing steps may also be expressed as method flowcharts. FIG. 8 is an example flowchart of a method. In block 802, a first image of an ID is received. In block 804, a fraud risk score is generated for the first image. In block 806, additional images associated with the ID are received. In block 808, the additional images are processed according to pattern recognition functions. In block 810, the fraud risk score for the first image is evaluated based on at least one outcome of the pattern recognition functions. In block 812, a new fraud risk score for the first image is determined.

Referring to FIGS. 9A and 9B, fraudsters may sometimes take photos of ID on the same background, such as on the same desk or table. Additionally, in some cases fraudsters take photos of themselves from the same room background. In one implementation, negative space fragments are obtained by masking a portion of a describable image. As some examples, masking may be performed of a face in a selfie or ID; or masking an ID relative to its background. In one implementation, the background which the document is submitted with is analyzed and vectorized as a variant component; if a variant component is repeated in two different instances of unrelated IDs, the knowledge graph will create a fraud alert. In one example, in the preprocessing of an ID document, first the document picture is separated from the background image (i.e., the desk in which the ID sits on when taking the photo). In this implementation, the background image will be transformed into a mathematical representation (i.e., a vector). This background vector will be compared when a new ID document verification transaction comes in. If two unrelated documents share the variant background vector, the system will create a fraud alert. Fraudsters typically take one picture with a specific background, then change the details of the ID document but rarely change the background. In the real-world, even when the same person is submitting the same ID in the same environment, due to slight changes in camera angle, lighting, and movements in the background, the background images across submission will be slightly different.

In contrast, a fraudster may submit different IDs on the exact same background, such as the background of the same room, such as on the same desk, table, or the same floor/carped. Also, for a fraudster positioning of the IDs during image capture is often identical. This creates what can be called invariance where the expectation is variance.

Figure 10:
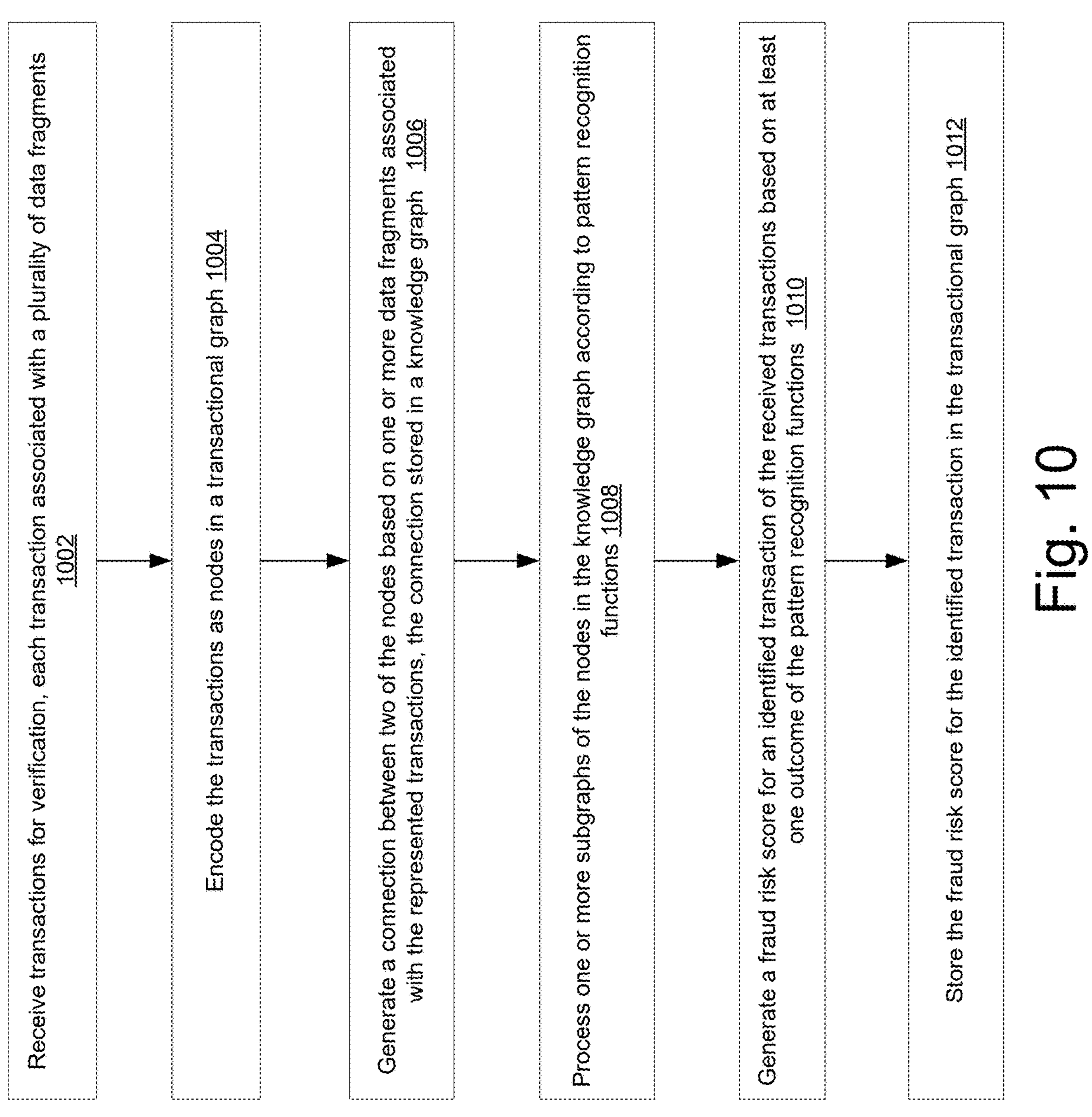
FIG. 10 illustrates an example flow chart of a method in accordance with an implementation.

FIG. 10 is an example flowchart of a method. In block 1002, transactions are received for verification, each transaction associated with a plurality of data fragments. In block 1004, the transactions are encoded as nodes in a transactional graph. In block 1006, a connection is generated between two of the nodes based on one or more data fragments associated with the represented transactions, the connection stored in a knowledge graph. For example, the connection may be generated by the data association module 146. In block 1008, one or more subgraphs of the nodes in the knowledge graph are processed according to pattern recognition functions. In block 1010, a fraud risk score for an identified transaction of the received transactions is generated based on at least one outcome of the pattern recognition functions. In block 1012, the fraud risk score for the identified transaction is stored in the transactional graph.

Figure 11:
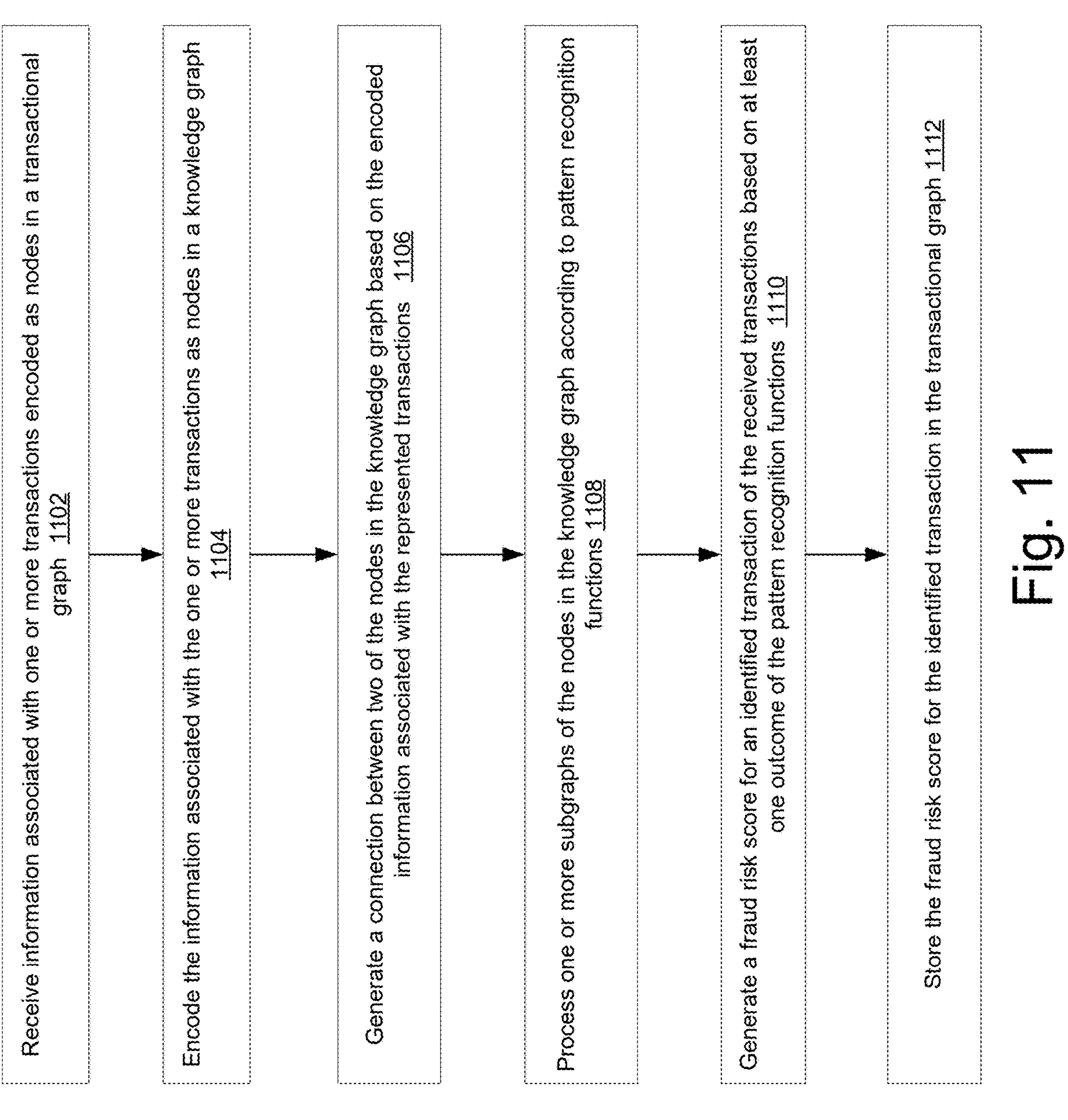
FIG. 11 illustrates an example flow chart of a method in accordance with an implementation.

FIG. 11 is an example flowchart of a method. In block 1102, information is received associated with one or more transactions encoded as nodes in a transactional graph. In block 1104, the information associated with the one or more transactions are encoded as nodes in a knowledge graph. In block 1106, a connection is generated between two of the nodes in the knowledge graph based on the encoded information associated with the represented transactions. For example, the connection may be generated by the data association module 146. In block 1108, one or more subgraphs of the nodes in the knowledge graph are processed according to pattern recognition functions. In block 1110, a fraud risk score for an identified transaction of the received transactions is generated based on at least one outcome of the pattern recognition functions. In block 1112, the fraud risk score for the identified transaction is stored in the transactional graph.

Figure 12:
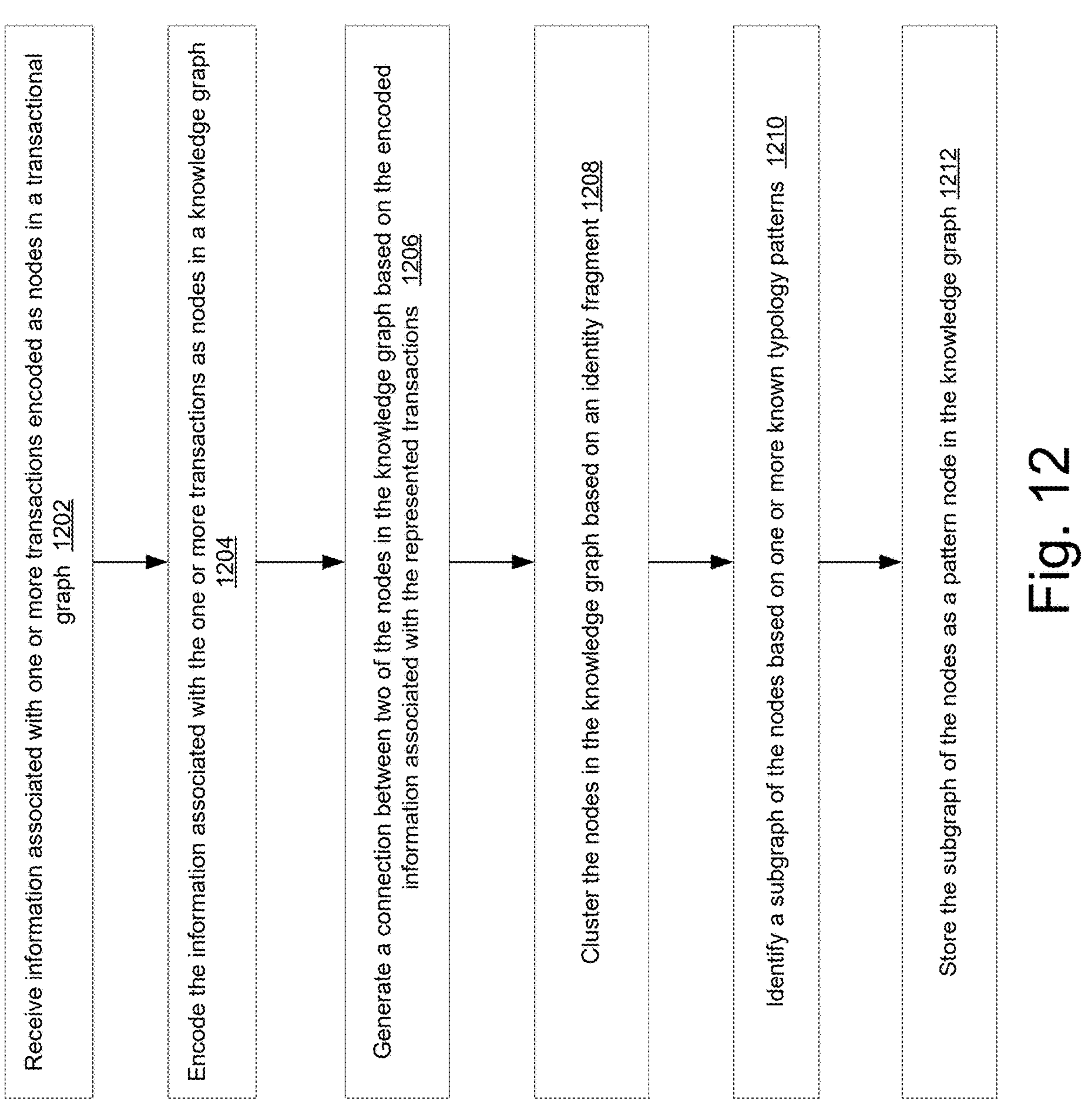
FIG. 12 illustrates an example flow chart of a method in accordance with an implementation.

FIG. 12 is an example flowchart of a method. In block 1202, information is received associated with one or more transactions encoded as nodes in a transactional graph. In block 1204, the information associated with the one or more transactions are encoded as nodes in a knowledge graph. In block 1206, a connection is generated between two of the nodes in the knowledge graph based on the encoded information associated with the represented transactions. For example, the connection may be generated by the data association module 146. In block 1208, the nodes in the knowledge graph are clustered based on an identity fragment. In block 1210, a subgraph of the nodes is identified based on one or more known typology patterns. In block 1212, the subgraph of the nodes is stored as a pattern node in the knowledge graph.

Figure 13:
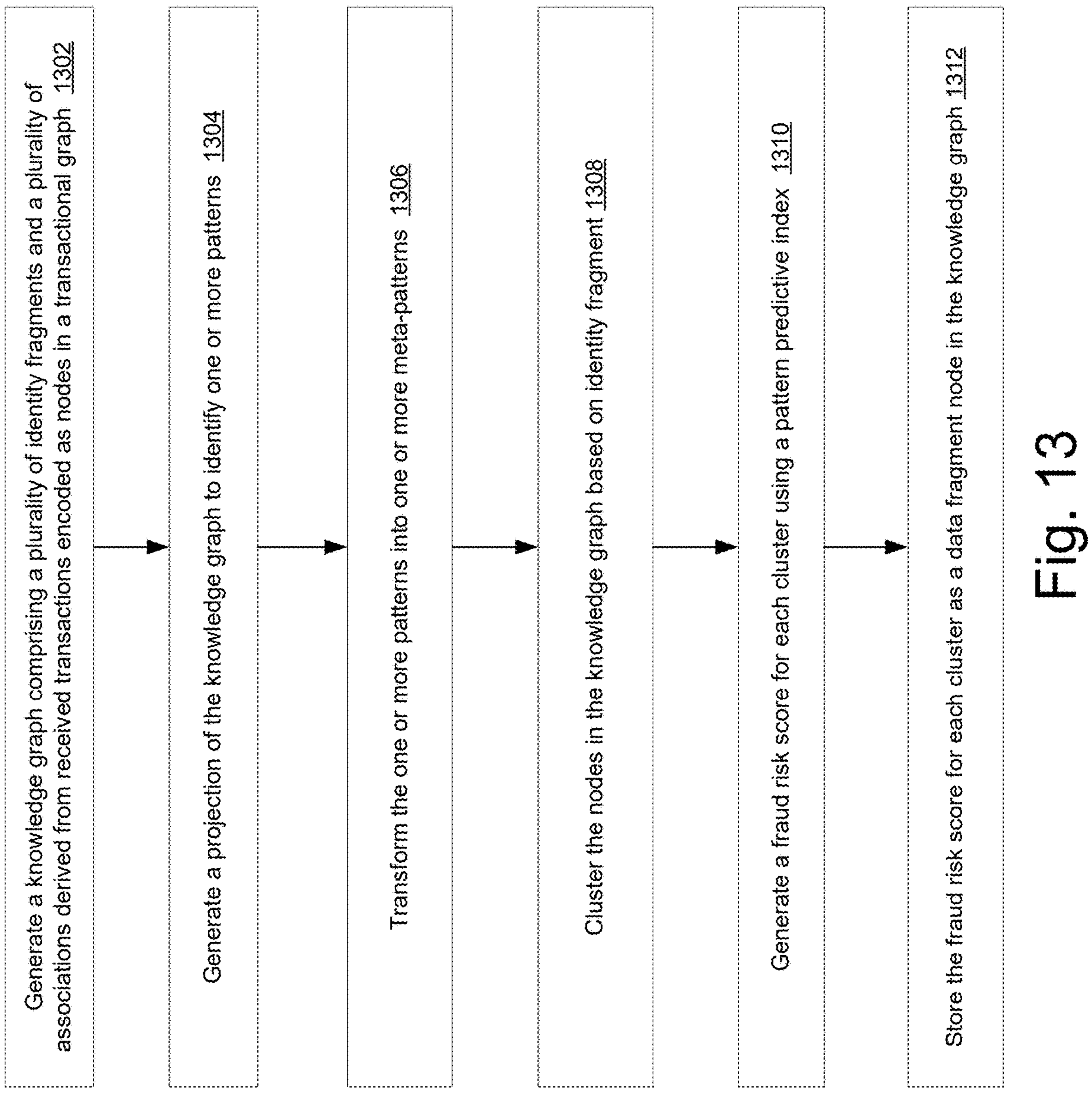
FIG. 13 illustrates an example flow chart of a method in accordance with an implementation.

FIG. 13 is an example flowchart of a method. In block 1302, a knowledge graph is generated comprising a plurality of identity fragments and a plurality of associations derived from received transactions encoded as nodes in a transactional graph. In block 1304, a projection of the knowledge graph is generated to identify one or more patterns. For example, one or more mathematical calculations may be performed to generate a projection of the knowledge graph to identify one or more patterns by the pattern generation module 140. In block 1306, the one or more patterns are transformed into one or more meta-patterns. For example, the meta-patterns may be generated from the one or more patterns by the meta pattern generator 572. In block 1308, the nodes in the knowledge graph are clustered based on an identity fragment. In block 1310, a fraud risk score for each cluster is generated using a pattern predictive index. For example, the pattern predictive index module 574 may be used to generate a fraud risk score for each cluster. In block 1312, the fraud risk score for each cluster is stored as a data fragment node in the knowledge graph.

Other Considerations

It should be understood that the above-described examples are provided by way of illustration and not limitation and that numerous additional use cases are contemplated and encompassed by the present disclosure. In the above description, for purposes of explanation, numerous specific details are set forth in order to provide a thorough understanding of the present disclosure. However, it should be understood that the technology described herein may be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

Reference in the specification to "one implementation" or "an implementation" or "some implementations" means that a particular feature, structure, or characteristic described in connection with the implementation is included in at least one implementation. The appearances of the phrase "in some implementations" in various places in the specification are not necessarily all referring to the same implementations.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As should be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies, engines, and other aspects of the disclosure can be implemented as software, hardware, firmware, or any combination of the foregoing. Also, wherever an element, an example of which is a module, of the specification is implemented as software, the element can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A computer-implemented method, comprising:

receiving a first image of a document associated with a transaction;

generating a fraud risk score associated with the transaction based on a verification process on the first image of the document;

storing the fraud risk score in association with the transaction in a database;

receiving additional images associated with the document;

processing the additional images according to one or more pattern recognition functions;

evaluating the fraud risk score associated with the transaction based on at least one outcome of the pattern recognition functions;

determining a new fraud risk score associated with the transaction; and storing the new fraud risk score as the fraud risk score in association with the transaction in the database;

identifying, for each image received, a plurality of data fragments associated with the transaction, each data fragment comprising identifying information about a person in the transaction;

generating a transaction graph based on received images and storing the transaction graph in the database;

determining one or more patterns of transactional data in the database, wherein the one or more patterns are stored in a knowledge graph in the database; and determining one or more meta-patterns from the one or more patterns stored in the knowledge graph in the database, wherein the one or more meta-patterns are determined based on one or more fraudulent transactions in the one or more patterns.

2. The method of claim 1, wherein the plurality of data fragments comprises photo fragments, context fragments, channel fragments, and identity fragments, and generating the transaction graph comprises enforcing a uniqueness property on identity fragment nodes such that identical identity fragments across transactions share a single fragment node.

3. The method of claim 1, further comprising:

for each data fragment about the person in the transaction, generating a unique identifier as a node in a knowledge graph stored in the database;

generating a cluster based on each data fragment; and storing the cluster as a node in the database.

4. The method of claim 3, further comprising populating the knowledge graph with probabilistic knowledge data based on clusters of transactional data in the database.

5. The method of claim 2, wherein the plurality of data fragments includes photo fragments, context fragments, channel fragments, and identity fragments.

6. The method of claim 2, wherein determining the one or more patterns of transation data comprises identifying a pattern wherein one document identity fragment connects multiple person identity fragments.

7. The method of claim 2, wherein the knowledge graph comprises multi-dimensional data.

8. The method of claim 6, wherein the one or more meta-patterns comprise a mixed pattern connecting multiple topology patterns through shared den fraudulent transactions.

9. The method of claim 3, further comprising:

creating fingerprints of one or more sub-graphs of the knowledge graph;

converting the fingerprints into vectors, comparing the vectors for similarity; and identifying a sub-graph having a low similarity as a discrepancy and determining a risk associated with the discrepancy, wherein the risk is generated as a probabilistic data value based on a cluster hierarchy.

10. A method of generating a plurality of knowledge graphs, comprising:

generating a knowledge graph comprising a plurality of identity fragments and a plurality of associations derived from received transactions encoded as nodes in a transactional graph;

generating a projection of the knowledge graph to identify one or more patterns;

transforming the one or more patterns into one or more meta-patterns;

clustering the nodes in the knowledge graph based on an identity fragment;

generating a fraud risk score associated with each cluster using a pattern predictive index;

storing the fraud risk score associated with each cluster as a data fragment node in the knowledge graph in a database;

identifying a subgraph of the nodes in the knowledge graph based on one or more known typology patterns; and storing the subgraph of the nodes as a pattern node in the knowledge graph in the database.

11. The method of claim 10, wherein the storing occurs in a cloud-based data storage system.

12. The method of claim 10, wherein a connection between two of the nodes in the knowledge graph is generated based on encoded information associated with the received transactions.

13. The method of claim 10, wherein transforming the one or more patterns into one or more meta-patterns comprises condensing each pattern into a pattern node connected to multiple typology pattern nodes through shared fraudulent transaction nodes.

14. A system comprising:

a processor; and a memory, the memory storing instructions that, when executed by the processor, cause the system to:

generate a knowledge graph comprising a plurality of identity fragments and a plurality of associations derived from received transactions encoded as nodes in a transactional graph;

generate a projection of the knowledge graph to identify one or more patterns;

transform the one or more patterns into one or more meta-patterns;

cluster the nodes in the knowledge graph based on an identity fragment;

generate a fraud risk score associated with each cluster using a pattern predictive index;

store the fraud risk score associated with each cluster as a data fragment node in the knowledge graph in a database;

identify a subgraph of the nodes in the knowledge graph based on one or more known typology patterns; and store the subgraph of the nodes as a pattern node in the knowledge graph in the database.

15. The system of claim 14, wherein the storing occurs in a cloud-based data storage system.

16. The system of claim 14, wherein a connection between two of the nodes in the knowledge graph is generated based on encoded information associated with the received transactions.

17. The system of claim 14, wherein the memory includes further instructions that, when executed by the processor, cause the system to:

transform the one or more patterns into one or more meta-patterns, wherein the transform comprises condensing each pattern into a pattern node connected to multiple typology pattern nodes through shared fraudulent transaction nodes.

18. The system of claim 14, wherein the memory includes further instructions that, when executed by the processor, cause the system to:

receive a first image of a document associated with a transaction;

generate a fraud risk score associated with the transaction based on a verification process on the first image of the document;

store the fraud risk score in association with the transaction in a database;

receive additional images associated with the document;

process the additional images according to one or more pattern recognition functions;

evaluate the fraud risk score associated with the transaction based on at least one outcome of the pattern recognition functions;

determine a new fraud risk score associated with the transaction; and store the new fraud risk score as the fraud risk score in association with the transaction in the database.

19. The system of claim 14, wherein the memory includes further instructions that, when executed by the processor, cause the system to:

for each image received, identify a plurality of data fragments associated with a transaction, each data fragment comprising identifying information about a person in the transaction;

generate a transaction graph based on received images; and store the transaction graph in the database.

20. The system of claim 14, wherein the memory includes further instructions that, when executed by the processor, cause the system to:

for each data fragment about a person in a transaction received, generate a unique identifier in the knowledge graph stored in the database;

generate a cluster based on each data fragment; and store the cluster as a node in the knowledge graph in the database.

* * * * *